(12) United States Patent
Luessem et al.

(10) Patent No.: US 8,715,527 B2
(45) Date of Patent: May 6, 2014

(54) LIQUID-CRYSTAL MEDIUM

(75) Inventors: Georg Luessem, Petershausen (DE);
Christian Hock, Mainaschaff (DE);
Brigitte Schuler, Grossostheim (DE);
Eike Poetsch, Muehltal (DE)

(73) Assignee: Merck Patent GmbH, Darmstadt (DE)

( * ) Notice: Subject to any disclaimer, the term of this patent is extended or adjusted under 35 U.S.C. 154(b) by 126 days.

(21) Appl. No.: 12/812,657

(22) PCT Filed: Dec. 23, 2008

(86) PCT No.: PCT/EP2008/011070
§ 371 (c)(1),
(2), (4) Date: Oct. 18, 2010

(87) PCT Pub. No.: WO2009/089898
PCT Pub. Date: Jul. 23, 2009

(65) Prior Publication Data
US 2011/0042615 A1    Feb. 24, 2011

(30) Foreign Application Priority Data
Jan. 14, 2008    (DE) .......................... 10 2008 004 157

(51) Int. Cl.
*C09K 19/34*    (2006.01)
*C09K 19/52*    (2006.01)
*C09K 19/06*    (2006.01)
*C09K 19/30*    (2006.01)
*C09K 19/12*    (2006.01)
*C09K 19/00*    (2006.01)
*C09K 19/02*    (2006.01)

(52) U.S. Cl.
USPC .............. 252/299.61; 252/299.01; 252/299.6; 252/299.63; 252/299.66; 428/1.1; 428/1.3; 349/182

(58) Field of Classification Search
USPC ............... 252/299.01, 299.6, 299.63, 299.66; 428/1.1, 1.3; 349/182
See application file for complete search history.

(56) References Cited

U.S. PATENT DOCUMENTS

| | | | |
|---|---|---|---|
| 7,074,462 B1 * | 7/2006 | Bremer et al. ................. | 428/1.1 |
| 7,189,440 B2 * | 3/2007 | Manabe et al. ................ | 428/1.3 |
| 7,662,443 B2 * | 2/2010 | Heckmeier et al. ............ | 428/1.1 |
| 7,670,502 B2 * | 3/2010 | Francis et al. ........... | 252/299.01 |
| 2004/0173776 A1 | 9/2004 | Heckmeier et al. | |
| 2004/0242905 A1 | 12/2004 | Poetsch et al. | |
| 2006/0278850 A1 | 12/2006 | Czanta et al. | |
| 2007/0001149 A1 | 1/2007 | Manabe et al. | |
| 2007/0176144 A1 | 8/2007 | Francis et al. | |

FOREIGN PATENT DOCUMENTS

| | | |
|---|---|---|
| DE | 10 2004 021 334 A1 | 12/2004 |
| EP | 1 813 662 A1 | 8/2007 |
| JP | 2004-238489 | 8/2004 |
| WO | WO 2005/081215 A1 | 9/2005 |

OTHER PUBLICATIONS

International Search Report of PCT/EP2008/011070 (May 7, 2009).
Patent Abstract of JP 2004-238489—Publication Date: Aug. 26, 2004 "Merck Patent GmbH".

* cited by examiner

*Primary Examiner* — Geraldina Visconti
(74) *Attorney, Agent, or Firm* — Millen, White, Zelano & Branigan, P.C.

(57) ABSTRACT

The invention relates to a liquid-crystalline medium based on a mixture of polar compounds of positive dielectric anisotropy, characterized in that it comprises one or more compounds of the formula I

I

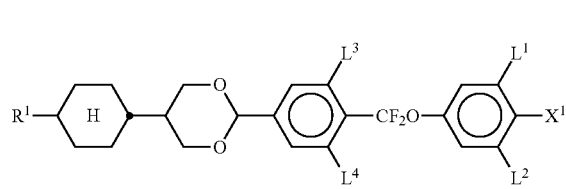

and one or more compounds selected from the compounds of the formulae IA and IB

IA

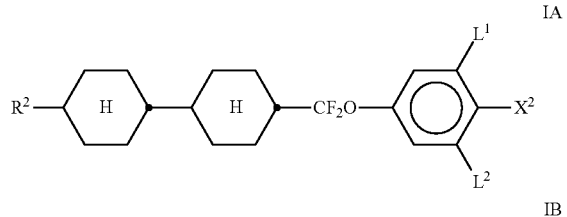

IB in which $R^1$, $R^2$, $L^{1-4}$, $X^1$ and $X^2$ have the meanings indicated in claim 1.

20 Claims, No Drawings

LIQUID-CRYSTAL MEDIUM

The present invention relates to a liquid-crystalline medium, to the use thereof for electro-optical purposes, to displays containing this medium, and to a process for the preparation of the liquid-crystalline medium.

Liquid crystals are used principally as dielectrics in display devices, since the optical properties of such substances can be modified by an applied voltage. Electro-optical devices based on liquid crystals are extremely well known to the person skilled in the art and can be based on various effects. Examples of such devices are cells having dynamic scattering, DAP (deformation of aligned phases) cells, guest/host cells, TN cells having a twisted nematic structure, STN (supertwisted nematic) cells, SBE (super-birefringence effect) cells and OMI (optical mode interference) cells. The commonest display devices are based on the Schadt-Helfrich effect and have a twisted nematic structure.

The liquid-crystal materials must have good chemical and thermal stability and good stability to electric fields and electromagnetic radiation. Furthermore, the liquid-crystal materials should have low viscosity and produce short addressing times, low threshold voltages and high contrast in the cells.

They should furthermore have a suitable mesophase, for example a nematic or cholesteric mesophase for the above-mentioned cells, at the usual operating temperatures, i.e. in the broadest possible range above and below room temperature. Since liquid crystals are generally used as mixtures of a plurality of components, it is important that the components are readily miscible with one another. Further properties, such as the electrical conductivity, the dielectric anisotropy and the optical anisotropy, have to satisfy various requirements depending on the cell type and area of application. For example, materials for cells having a twisted nematic structure should have positive dielectric anisotropy and low electrical conductivity.

For example, for matrix liquid-crystal displays with integrated non-linear elements for switching individual pixels (MLC displays), media having large positive dielectric anisotropy, broad nematic phases, relatively low birefringence, very high specific resistance, good UV and temperature stability and lower vapour pressure are desired.

Matrix liquid-crystal displays of this type are known. Non-linear elements which can be used for individual switching of the individual pixels are, for example, active elements (i.e. transistors). The term "active matrix" is then used, where a distinction can be made between two types:
1. MOS (metal oxide semiconductor) or other diodes on a silicon wafer as substrate.
2. Thin-film transistors (TFTs) on a glass plate as substrate.

The use of single-crystal silicon as substrate material restricts the display size, since even modular assembly of various part-displays results in problems at the joints.

In the case of the more promising type 2, which is preferred, the electro-optical effect used is usually the TN effect. A distinction is made between two technologies: TFTs comprising compound semiconductors, such as, for example, CdSe, or TFTs based on polycrystalline or amorphous silicon. Intensive work is being carried out worldwide on the latter technology.

The TFT matrix is applied to the inside of one glass plate of the display, while the other glass plate carries the transparent counterelectrode on its inside. Compared with the size of the pixel electrode, the TFT is very small and has virtually no adverse effect on the image. This technology can also be extended to fully colour-capable displays, in which a mosaic of red, green and blue filters is arranged in such a way that a filter element is opposite each switchable pixel.

The TFT displays usually operate as TN cells with crossed polarisers in transmission and are back-lit.

The term MLC displays here covers any matrix display with integrated non-linear elements, i.e., besides the active matrix, also displays with passive elements, such as varistors or diodes (MIM=metal-insulator-metal).

MLC displays of this type are particularly suitable for TV applications (for example pocket TVs) or for high-information displays for computer applications (laptops) and in automobile or aircraft construction. Besides problems regarding the angle dependence of the contrast and the response times, difficulties also arise in MLC displays due to insufficiently high specific resistance of the liquid-crystal mixtures [TOGASHI, S., SEKOGUCHI, K., TANABE, H., YAMAMOTO, E., SORIMACHI, K., TAJIMA, E., WATANABE, H., SHIMIZU, H., Proc. Eurodisplay 84, September 1984: A 210-288 Matrix LCD Controlled by Double Stage Diode Rings, pp. 141 ff, Paris; STROMER, M., Proc. Eurodisplay 84, September 1984: Design of Thin Film Transistors for Matrix Addressing of Television Liquid Crystal Displays, pp. 145 ff, Paris]. With decreasing resistance, the contrast of an MLC display deteriorates, and the problem of after-image elimination may occur. Since the specific resistance of the liquid-crystal mixture generally drops over the life of an MLC display owing to interaction with the interior surfaces of the display, a high (initial) resistance is very important in order to obtain acceptable service lives. In particular in the case of low-volt mixtures, it was hitherto impossible to achieve very high specific resistance values. It is furthermore important that the specific resistance exhibits the smallest possible increase with increasing temperature and after heating and/or UV exposure. The low-temperature properties of the mixtures from the prior art are also particularly disadvantageous. It is demanded that no crystallisation and/or smectic phases occur, even at low temperatures, and the temperature dependence of the viscosity is as low as possible. The MLC displays from the prior art thus do not satisfy today's requirements.

There thus continues to be a great demand for MLC displays having very high specific resistance at the same time as a large working-temperature range, short response times even at low temperatures and a low threshold voltage which do not have these disadvantages, or only do so to a reduced extent.

In addition to liquid-crystal displays which use back-lighting, i.e. are operated transmissively and if desired transflectively, reflective liquid-crystal displays are also particularly interesting. These reflective liquid-crystal displays use the ambient light for information display. They thus consume significantly less energy than back-lit liquid-crystal displays having a corresponding size and resolution. Since the TN effect is characterised by very good contrast, reflective displays of this type can even be read well in bright ambient conditions. This is already known of simple reflective TN displays, as used, for example, in watches and pocket calculators. However, the principle can also be applied to high-quality, higher-resolution active matrix-addressed displays, such as, for example, TFT displays. Here, as already in the transmissive TFT-TN displays which are generally conventional, the use of liquid crystals of low birefringence ($\Delta n$) is necessary in order to achieve low optical retardation ($d \cdot \Delta n$). This low optical retardation results in usually acceptable low viewing-angle dependence of the contrast (cf. DE 30 22 818). In reflective displays, the use of liquid crystals of low birefringence is even more important than in transmissive displays since the effective layer thickness through which the light passes is approximately twice as large in reflective displays as in transmissive displays having the same layer thickness.

In TN (Schadt-Helfrich) cells, media are desired which facilitate the following advantages in the cells:
  extended nematic phase range (in particular down to low temperatures)
  storage stability, even at extremely low temperatures
  the ability to switch at extremely low temperatures (outdoor use, automobiles, avionics)
  increased resistance to UV radiation (longer service life)
  low optical birefringence (Δn) for reflective displays.

The media available from the prior art do not allow these advantages to be achieved while at the same time retaining the other parameters.

In the case of supertwisted (STN) cells, media are desired which enable greater multiplexability and/or a lower threshold voltage and/or broader nematic phase ranges (in particular at low temperatures). To this end, a further widening of the available parameter latitude (clearing point, smectic-nematic transition or melting point, viscosity, dielectric parameters, elastic parameters) is urgently desired.

The invention has the object of providing media, in particular for MLC, TN or STN displays of this type, which do not have the above-mentioned disadvantages or only do so to a reduced extent, and preferably simultaneously have very low threshold voltages, low viscosities and high values for the voltage holding ratio (VHR).

It has now been found that this object can be achieved if media according to the invention are used in displays.

The invention thus relates to a liquid-crystalline medium, preferably based on a mixture of polar compounds of positive dielectric anisotropy, which is characterised in that it comprises one or more compounds of the formula I

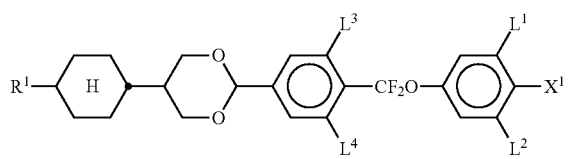
I and one or more compounds selected from the compounds of the formulae IA and IB

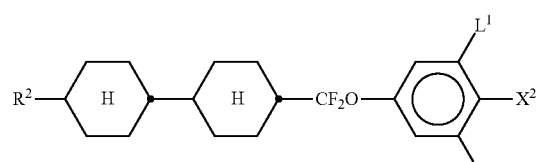
IA

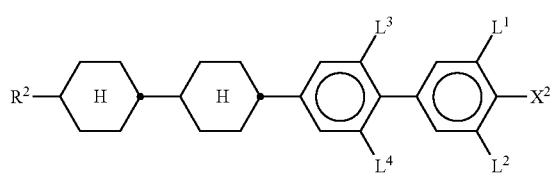
IB in which
$R^1$, $R^2$ each, independently of one another, denote H, a halogenated, CN-substituted or unsubstituted alkyl radical having 1 to 15 C atoms, where, in addition, one or more $CH_2$ groups in these radicals may each be replaced, independently of one another, by —C≡C—, —CO—, —CH=CH—, —O—,

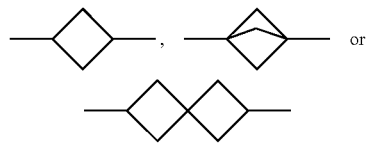

in such a way that O atoms are not linked directly to one another,
$X^1$, $X^2$ each, independently of one another, denote F, Cl, CN, $SF_5$, SCN, NCS, a halogenated alkyl radical, a halogenated alkenyl radical, a halogenated alkoxy radical or a halogenated alkenyloxy radical, each having up to 6 C atoms, and
$L^{1-4}$ each, independently of one another, denote H or F.

The compounds of the formulae I, IA and IB have a broad range of applications. Depending on the choice of substituents, these compounds can serve as base materials of which liquid-crystalline media are predominantly composed; however, it is also possible to add compounds of the formulae I and IA/IB to liquid-crystalline base materials from other classes of compound in order, for example, to modify the dielectric and/or optical anisotropy of a dielectric of this type and/or in order to optimise its threshold voltage and/or its viscosity. The mixing concept according to the invention results in mixtures which are distinguished over the prior art by their very good long-term stability and $V_{th}/\gamma_1$ ratio. The mixtures according to the invention are particularly suitable for notebook PC, PDA and other mobile applications.

In the pure state, the compounds of the formulae I, IA and IB are colourless and form liquid-crystalline mesophases in a temperature range which is favourably located for electro-optical use. They are stable chemically, thermally and to light.

If $R^{1/2}$ in the formulae I/IA/IB denotes an alkyl radical and/or an alkoxy radical, this may be straight-chain or branched. It is preferably straight-chain, has 1, 2, 3, 4, 5, 6 or 7 C atoms and accordingly preferably denotes methyl, ethyl, propyl, butyl, pentyl, hexyl, heptyl, methoxy, ethoxy, propoxy, butoxy, pentoxy, hexyloxy or heptyloxy, furthermore octyl, nonyl, decyl, undecyl, dodecyl, tridecyl, tetradecyl, pentadecyl, octyloxy, nonyloxy, decyloxy, undecyloxy, dodecyloxy, tridecyloxy or tetradecyloxy.

If $R^{1/2}$ denotes an alkyl radical in which one $CH_2$ group has been replaced by —CH=CH—, this may be straight-chain or branched. It is preferably straight-chain and has 2 to 10 C atoms. Accordingly, it denotes, in particular, vinyl, prop-1- or -2-enyl, but-1-, -2- or -3-enyl, pent-1-, -2-, -3- or -4-enyl, hex-1-, -2-, -3-, -4- or -5-enyl, hept-1-, -2-, -3-, -4-, -5- or -6-enyl, oct-1-, -2-, -3-, -4-, -5-, -6- or -7-enyl, non-1-, -2-, -3-, -4-, -5-, -6-, -7- or -8-enyl, or dec-1-, -2-, -3-, -4-, -5-, -6-, -7-, -8- or -9-enyl.

If $R^{1/2}$ denotes an alkyl radical in which one $CH_2$ group has been replaced by —O— and one has been replaced by —CO—, these are preferably adjacent. These thus contain an acyloxy group —CO—O— or an oxycarbonyl group —O—CO—. These are preferably straight-chain and have 2 to 6 C atoms. Accordingly, they denote, in particular, acetoxy, propionyloxy, butyryloxy, pentanoyloxy, hexanoyloxy, acetoxymethyl, propionyloxymethyl, butyryloxymethyl, pentanoyloxymethyl, 2-acetoxyethyl, 2-propionyloxyethyl, 2-butyryloxyethyl, 2-acetoxypropyl, 3-propionyloxypropyl, 4-acetoxybutyl, methoxycarbonyl, ethoxycarbonyl, propoxycarbonyl, butoxycarbonyl, pentoxycarbonyl, methoxycarbonylmethyl, ethoxycarbonylmethyl, propoxycarbonylmethyl, butoxycarbonylmethyl, 2-(methoxycarbonyl)ethyl, 2-(ethoxycarbonyl)ethyl, 2-(propoxycarbonyl)ethyl, 3-(methoxycarbonyl)propyl, 3-(ethoxycarbonyl)propyl or 4-(methoxycarbonyl)butyl.

If $R^{1/2}$ denotes an alkyl radical in which one $CH_2$ group has been replaced by unsubstituted or substituted —CH=CH— and an adjacent $CH_2$ group has been replaced by CO or CO—O or O—CO, this may be straight-chain or branched. It is preferably straight-chain and has 4 to 12 C atoms. Accordingly, it denotes, in particular, acryloyloxymethyl, 2-acryloyloxyethyl, 3-acryloyloxypropyl, 4-acryloyloxybutyl, 5-acryloyloxypentyl, 6-acryloyloxyhexyl, 7-acryloyloxyheptyl, 8-acryloyloxyoctyl, 9-acryloyloxynonyl, 10-acryloyloxydecyl, methacryloyloxymethyl, 2-methacryloyloxyethyl, 3-methacryloyloxypropyl, 4-methacryloyloxybutyl, 5-methacryloyloxypentyl, 6-methacryloyloxyhexyl, 7-methacryloyloxyheptyl, 8-methacryloyloxyoctyl or 9-methacryloyloxynonyl.

If $R^{1/2}$ denotes an alkyl or alkenyl radical which is monosubstituted by CN, this radical is preferably straight-chain. The substitution by CN is in any desired position.

If $R^{1/2}$ denotes an alkyl or alkenyl radical which is at least monosubstituted by halogen, this radical is preferably straight-chain, and halogen is preferably F or Cl. In the case of polysubstitution, halogen is preferably F. The resultant radicals also include perfluorinated radicals. In the case of monosubstitution, the fluorine or chlorine substituent may be in any desired position, but is preferably in the ω-position.

Compounds containing branched wing groups $R^{1/2}$ may occasionally be of importance owing to better solubility in the conventional liquid-crystalline base materials, but in particular as chiral dopants if they are optically active. Smectic compounds of this type are suitable as components of ferroelectric materials.

Branched groups of this type generally contain not more than one chain branch. Preferred branched radicals $R^{1/2}$ are isopropyl, 2-butyl (=1-methylpropyl), isobutyl (=2-methylpropyl), 2-methylbutyl, isopentyl (=3-methylbutyl), 2-methylpentyl, 3-methylpentyl, 2-ethylhexyl, 2-propylpentyl, isopropoxy, 2-methylpropoxy, 2-methylbutoxy, 3-methylbutoxy, 2-methylpentoxy, 3-methylpentoxy, 2-ethylhexyloxy, 1-methylhexyloxy and 1-methylheptyloxy.

If $R^{1/2}$ represents an alkyl radical in which two or more $CH_2$ groups have been replaced by —O— and/or —CO—O—, this may be straight-chain or branched. It is preferably branched and has 3 to 12 C atoms. Accordingly, it is in particular biscarboxymethyl, 2,2-biscarboxyethyl, 3,3-biscarboxypropyl, 4,4-biscarboxybutyl, 5,5-biscarboxypentyl, 6,6-biscarboxyhexyl, 7,7-biscarboxyheptyl, 8,8-biscarboxyoctyl, 9,9-biscarboxynonyl, 10,10-biscarboxydecyl, bis(methoxycarbonyl)methyl, 2,2-bis(methoxycarbonyl)ethyl, 3,3-bis(methoxycarbonyl)propyl, 4,4-bis(methoxycarbonyl)butyl, 5,5-bis-(methoxycarbonyl)pentyl, 6,6-bis(methoxycarbonyl)hexyl, 7,7-bis(methoxycarbonyl)heptyl, 8,8-bis(methoxycarbonyl)octyl, bis(ethoxycarbonyl)methyl, 2,2-bis(ethoxycarbonyl)ethyl, 3,3-bis(ethoxycarbonyl)propyl, 4,4-bis-(ethoxycarbonyl)butyl or 5,5-bis(ethoxycarbonyl)hexyl.

The compounds of the formulae I, IA and IB are prepared by methods known per se, as described in the literature (for example in the standard works, such as Houben-Weyl, Methoden der organischen Chemie [Methods of Organic Chemistry], Georg-Thieme-Verlag, Stuttgart), to be precise under reaction conditions which are known and suitable for the said reactions. Use can also be made here of variants which are known per se, but are not mentioned here in greater detail. The compounds of the formula I are prepared, for example, as described in DE 102004021334 A1.

The invention also relates to electro-optical displays (in particular STN or MLC displays having two plane-parallel outer plates, which, together with a frame, form a cell, integrated non-linear elements for switching individual pixels on the outer plates, and a nematic liquid-crystal mixture of positive dielectric anisotropy and high specific resistance which is located in the cell) which contain media of this type, and to the use of these media for electro-optical purposes.

The liquid-crystal mixtures according to the invention enable a significant widening of the available parameter latitude. The achievable combinations of clearing point, viscosity at low temperature, thermal and UV stability and dielectric anisotropy are far superior to previous materials from the prior art.

Compared with the mixtures disclosed in the prior art, the mixtures according to the invention have a higher clearing point, low $\gamma_1$ values, lower values for the flow viscosity and very high values for the VHR at 100° C. The mixtures according to the invention are preferably suitable as TN-TFT mixtures for monitors or (partially) reflective displays.

The liquid-crystal mixtures according to the invention, while retaining the nematic phase down to −30° C., particularly preferably down to −40° C., with a clearing point above 70° C., preferably above 75° C., particularly preferably ≥80° C., simultaneously enable dielectric anisotropy values Δ∈ of ≥6, preferably ≥8, and a high value for the specific resistance to be achieved, enabling excellent STN and MLC displays to be obtained. In particular, the mixtures are characterised by low operating voltages. The TN thresholds are below 1.5 V, preferably below 1.3 V, particularly preferably ≤1.2 V.

It goes without saying that, through a suitable choice of the components of the mixtures according to the invention, it is also possible for higher clearing points (for example above 110° C.) to be achieved at higher threshold voltages or lower clearing points to be achieved at lower threshold voltages with retention of the other advantageous properties. At viscosities correspondingly increased only slightly, it is likewise possible to obtain mixtures having greater Δ∈ and thus low thresholds. The MLC displays according to the invention preferably operate at the first Gooch and Tarry transmission minimum [C. H. Gooch and H. A. Tarry, Electron. Lett. 10, 2-4, 1974; C. H. Gooch and H. A. Tarry, Appl. Phys., Vol. 8, 1575-1584, 1975], where, besides particularly favourable electro-optical properties, such as, for example, high steepness of the characteristic line and low angle dependence of the contrast (German Patent 30 22 818), a lower dielectric anisotropy is sufficient at the same threshold voltage as in an analogous display at the second minimum. This enables significantly higher specific resistance values to be achieved using the mixtures according to the invention at the first minimum than in the case of mixtures comprising cyano compounds. Through a suitable choice of the individual components and their proportions by weight, the person skilled in the art is able to set the birefringence necessary for a pre-specified layer thickness of the MLC display using simple routine methods.

The rotational viscosity $\gamma_1$ at 20° C. of the mixtures according to the invention is preferably <140 mPa·s, particularly preferably <120 mPa·s. The nematic phase range is preferably at least 100°, in particular at least 110°. This range preferably extends at least from −40° to +75°.

A short response time is desired in liquid-crystal displays. This applies in particular to displays which are intended to be capable of the reproduction of video. For displays of this type, response times (sum: $t_{on}+t_{off}$) of at most 16 ms are required. The upper limit of the response time is determined by the image refresh frequency.

Measurements of the voltage holding ratio (HR) [S. Matsumoto et al., Liquid Crystals 5, 1320 (1989); K. Niwa et al., Proc. SID Conference, San Francisco, June 1984, p. 304 (1984); G. Weber et al., Liquid Crystals 5, 1381 (1989)] have shown that mixtures according to the invention comprising compounds of the formulae I and IA/IB exhibit a significantly smaller decrease in the HR with increasing temperature than analogous mixtures comprising cyanophenylcyclohexanes of the formula

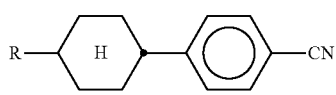

or esters of the formula

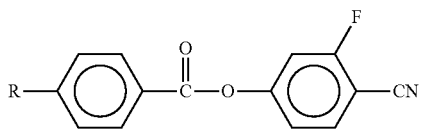

instead of the compounds of the formula IA.

The mixtures according to the invention preferably comprise little (≤20%, in particular ≤10%) or no nitriles. The holding ratio of the mixtures according to the invention at 20° C. is at least 98%, preferably >99%. The UV stability of the mixtures according to the invention is also considerably better, i.e. they exhibit a significantly smaller decrease in the HR on exposure to UV.

$R^1$ in the compounds of the formula I preferably denotes straight-chain alkyl having 1 to 7 C atoms, in particular $CH_3$, $C_2H_5$, n-$C_3H_7$, n-$C_4H_9$, n-$C_5H_{11}$, n-$C_6H_{13}$, n-$C_7H_{15}$, furthermore 1E- or 3-alkenyl, in particular $CH_2$=CH, $CH_3CH$=CH, $CH_2$=$CHCH_2CH_2$, $CH_3CH$=CH—$CH_2CH_2$.

Formula I preferably encompasses compounds of the formulae I-1 to I-5:

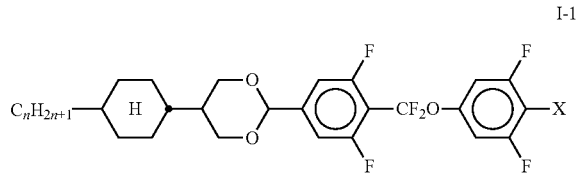

I-1

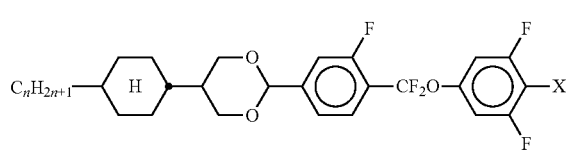

I-2

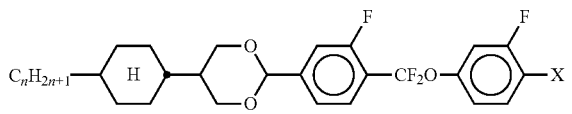

I-3

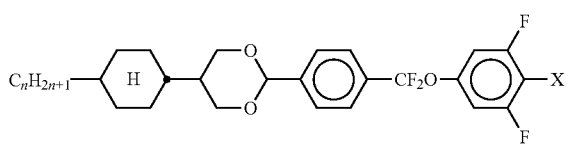

I-4

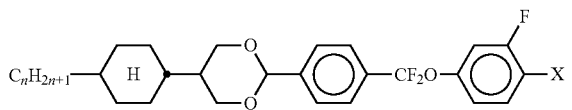

I-5 in which n denotes 1, 2, 3, 4, 5, 6 or 7.

Particularly preferred compounds of the formula I are compounds of the formulae I and I-1 to I-5 in which
X denotes F or $OCF_3$.

Preference is given to media according to the invention which comprise at least one compound of the formulae I-1 and/or I-2.

Preferred compounds of the formula IA are compounds of the formulae IA-1 to IA-4:

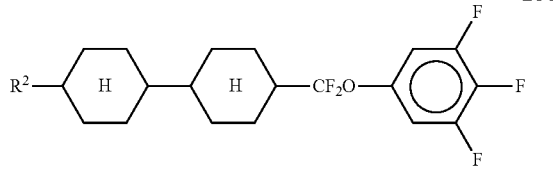

IA-1

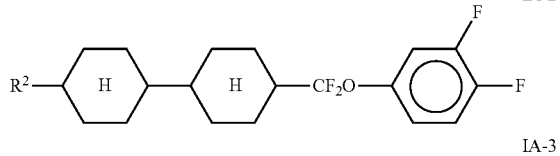

IA-2

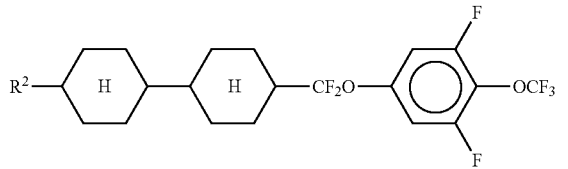

IA-3

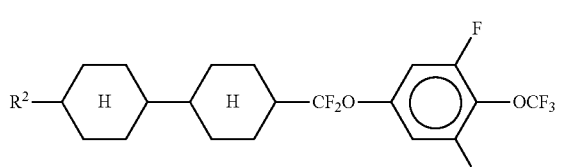

IA-4 in which $R^2$ has the meanings indicated above.

Of these preferred compounds, particular preference is given to those of the formulae IA-1 and IA-2.

Preferred compounds of the formula IB are compounds of the formulae IB-1 to IB-4:

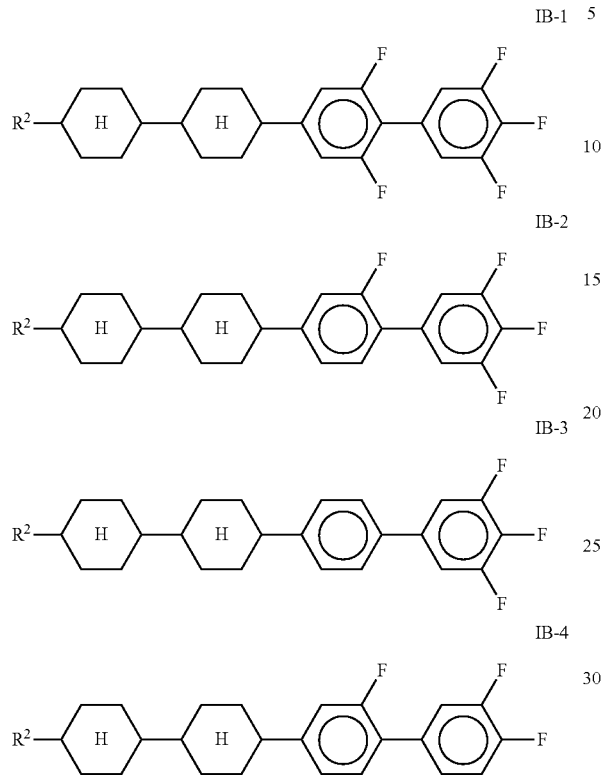

in which R² has the meanings indicated above.

The 1,4-substituted cyclohexane rings in the compounds of the formulae I, IA and IB and the associated sub-formulae are preferably 1,4-trans-configured.

Preferred embodiments are indicated below:

The medium comprises one, two or more compounds selected from the group of the formulae IA-1 to IA-4;

The medium comprises one, two or more compounds selected from the group of the formulae IB-1 to IB-4;

The medium additionally comprises one or more compounds selected from the group consisting of the general formulae II to VI:

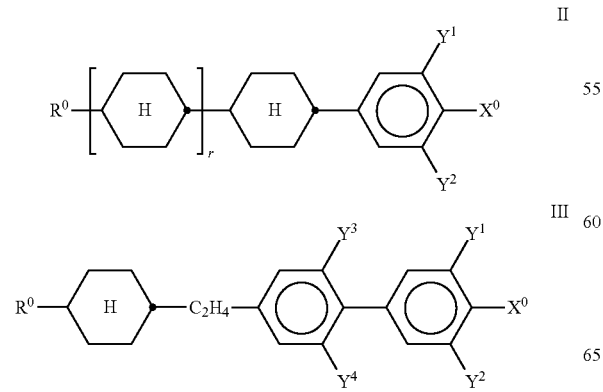

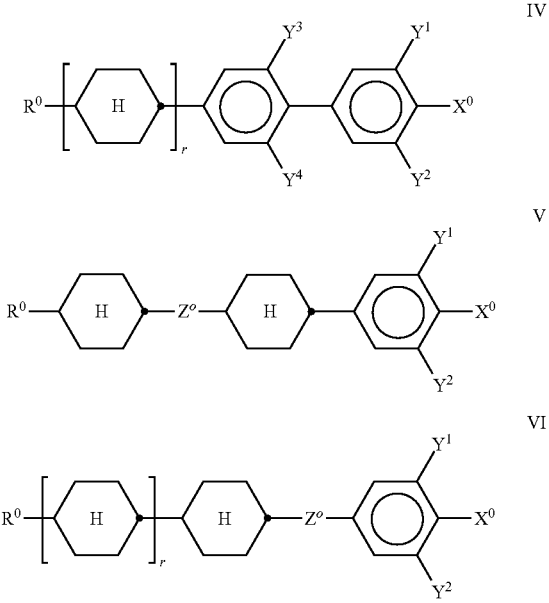

in which the individual radicals have the following meanings:

$R^0$ denotes H, n-alkyl, alkoxy, oxaalkyl, fluoroalkyl, alkenyloxy or alkenyl, each having up to 9 C atoms, $X^0$ denotes F, Cl, halogenated alkyl, alkenyl, alkenyloxy or alkoxy having up to 6 C atoms, $Z^0$ denotes —$C_2F_4$—, —CF=CF—, —CH=CF—, —CF=CH—, —CH=CH—, —$O(CH_2)_3$—, —$(CH_2)_3$O—, —$C_2H_4$—, —$(CH_2)_4$—, —$CF_2O$—, —$OCF_2$—, —$OCH_2$— or —$CH_2O$—, $Y^{1-4}$ each, independently of one another, denote H or F, r denotes 0 or 1.

The compound of the formula IV is preferably

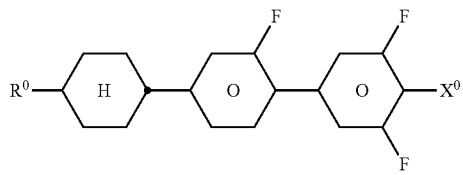

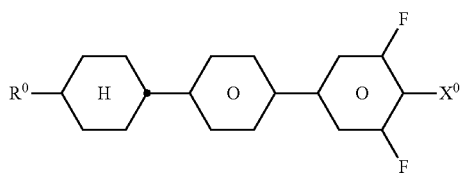

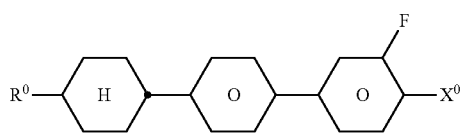

-continued

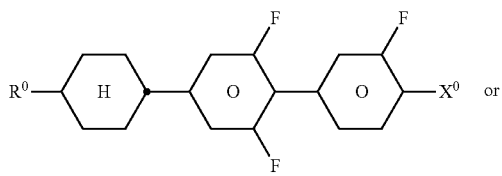
IVd

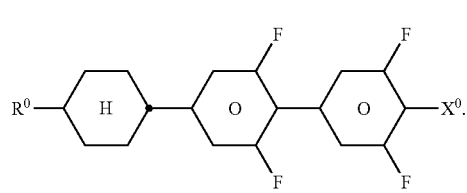
IVe

The medium additionally comprises one or more compounds selected from the group consisting of the general formulae VII to XI:

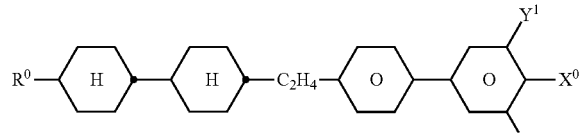
VII

VIII

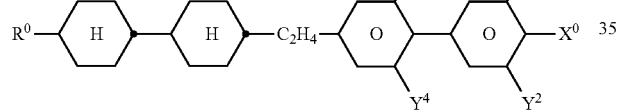
IX

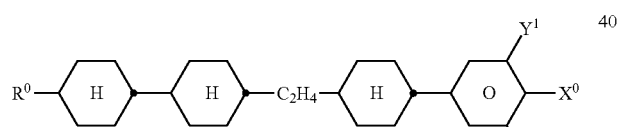
X

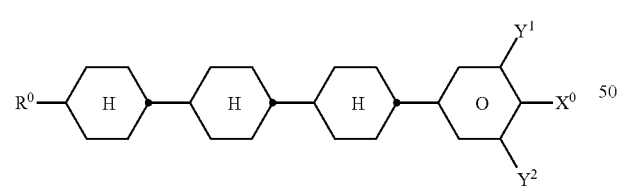
XI

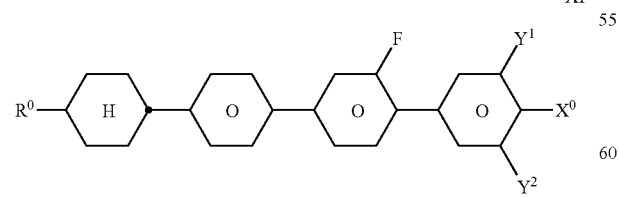

in which $R^0$, $X^0$, $Y^1$ and $Y^2$ each, independently of one another, have one of the meanings indicated above for formula II. $Y^3$ and $Y^4$ each, independently of one another, denote H or F. $X^0$ is preferably F, Cl, $CF_3$, $OCF_3$ or $OCHF_2$. $R^0$ preferably denotes alkyl, oxaalkyl, fluoroalkyl or alkenyl, each having up to 6 C atoms.

The medium comprises one or more ester compounds of the formulae Ea to Ef:

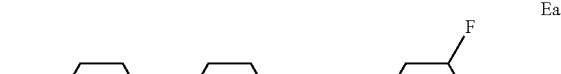
Ea

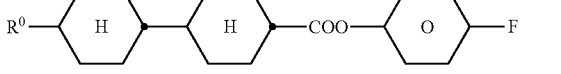
Eb

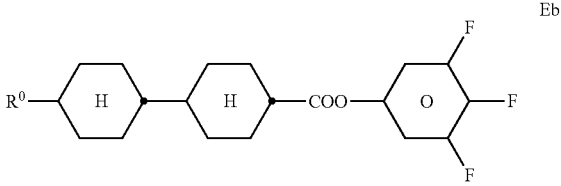
Ec

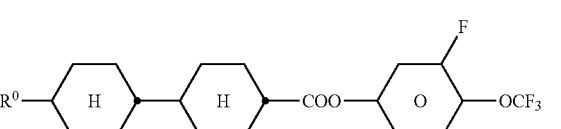
Ed

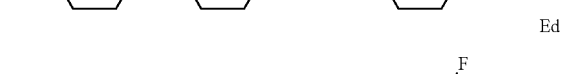

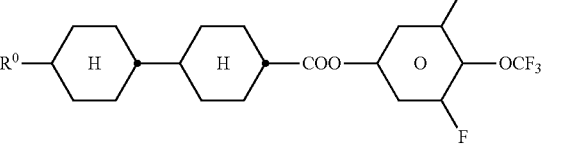
Ee

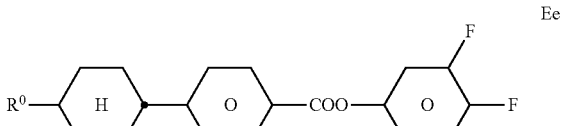
Ef

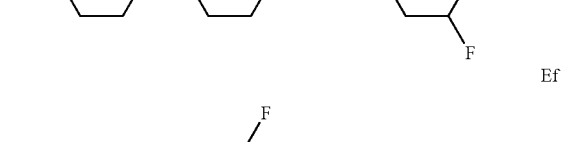

in which $R^0$ has the meaning indicated above for formula II;

The proportion of compounds of the formulae IA/IB and I to VI together in the mixture as a whole is at least 50% by weight;

The proportion of compounds of the formula I in the mixture as a whole is ≥5% by weight, preferably ≥10% by weight, in particular ≥12% by weight.

The proportion of compounds of the formula I in the mixture as a whole is 5 to 40, preferably 8 to 30% by weight and particularly preferably 10 to 30% by weight;

The proportion of compounds of the formula IA in the mixture as a whole is 10 to 50, particularly preferably 15 to 40% by weight;

The proportion of compounds of the formula IB in the mixture as a whole is 1 to 20, particularly preferably 2 to 10% by weight;

The proportion of compounds of the formulae II to VI in the mixture as a whole is 30 to 80% by weight;

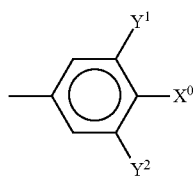

is preferably

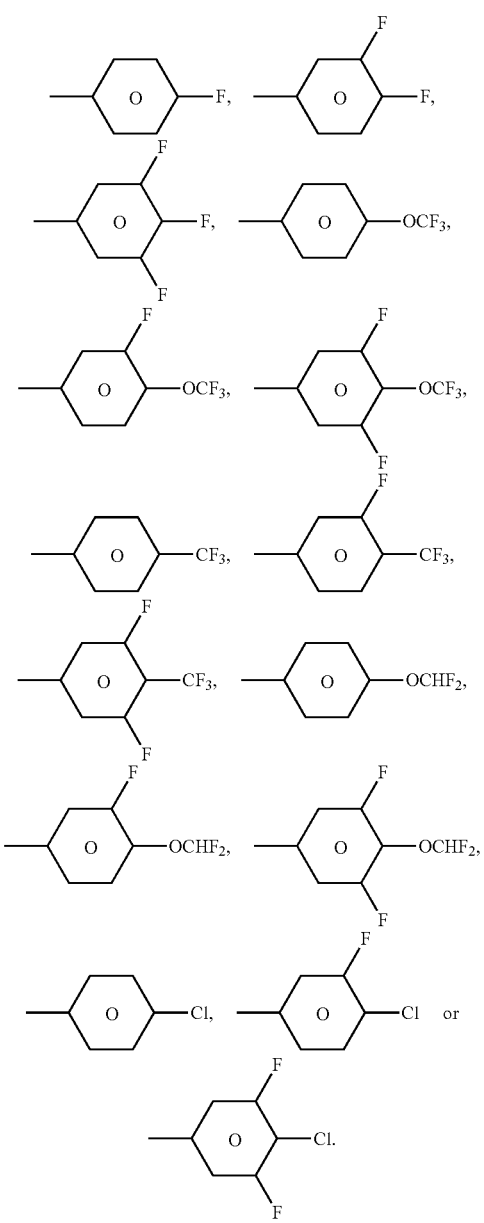

The medium comprises compounds of the formula II, III, IV, V or VI;

$R^0$ is straight-chain alkyl or alkenyl having 1 or 2 to 7 C atoms respectively;

The medium essentially consists of compounds of the formulae IA/IB and I to VI;

The medium additionally comprises one, two, three or more, preferably two or three, compounds of the formulae

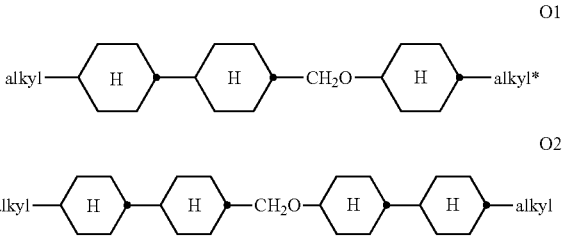

in which "alkyl" and "alkyl*" each, independently of one another, denote a straight-chain or branched alkyl radical having 1-9 C atoms.

The proportion of the compounds of the formulae O1 and/or O2 in the mixtures according to the invention is preferably 5-10% by weight.

The medium preferably comprises 5-35% by weight of compound IVa.

The medium preferably comprises one, two or three compounds of the formula IVa in which $X^0$ denotes F or $OCF_3$.

The medium preferably comprises one or more compounds of the formulae IIa to IIg:

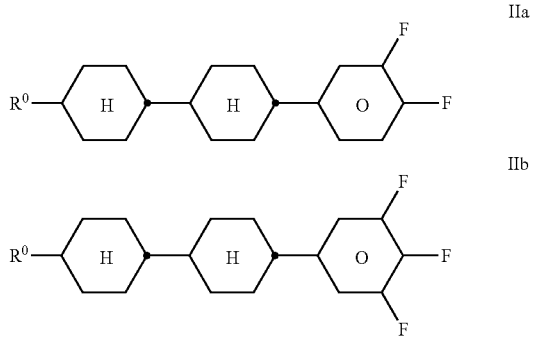

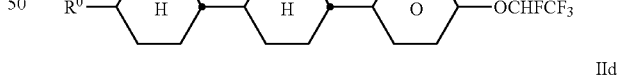

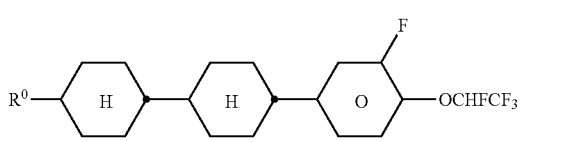

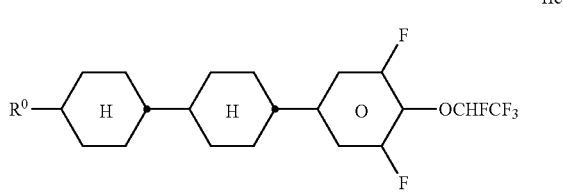

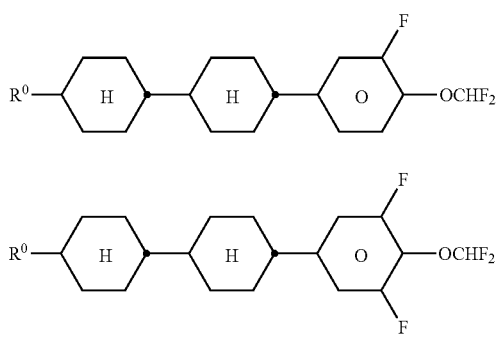

in which R⁰ has the meanings indicated above. In the compounds of the formulae IIa-IIg, R⁰ preferably denotes H, methyl, ethyl, n-propyl, n-butyl or n-pentyl, furthermore n-hexyl or n-heptyl.

The (I+IA/IB):(II+III+IV+V+VI) weight ratio is preferably 1:10 to 10:1.

The medium essentially consists of compounds selected from the group consisting of the general formulae IA/IB and I to XI.

The proportion of the compounds of the formulae IVb and/or IVc in which $X^0$ denotes fluorine and $R^0$ denotes $C_2H_5$, n-$C_3H_7$, n-$C_4H_5$ or n-$O_5H_{11}$ in the mixture as a whole is 2 to 20% by weight, in particular 2 to 15% by weight;

The medium preferably comprises one, two or three, furthermore four, homologues of the compounds selected from the group H1 to H15 (n=1-12):

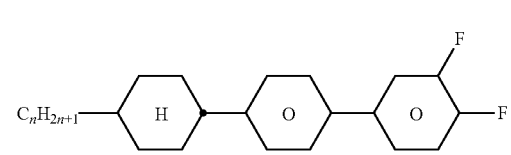

-continued

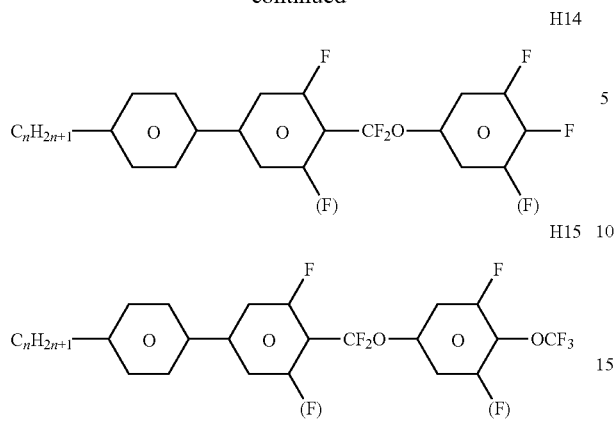

The medium preferably comprises compound IIb in which $R^0$ denotes methyl;

The medium comprises low Δn compounds, preferably selected from the following group consisting of the formulae RI to RVII:

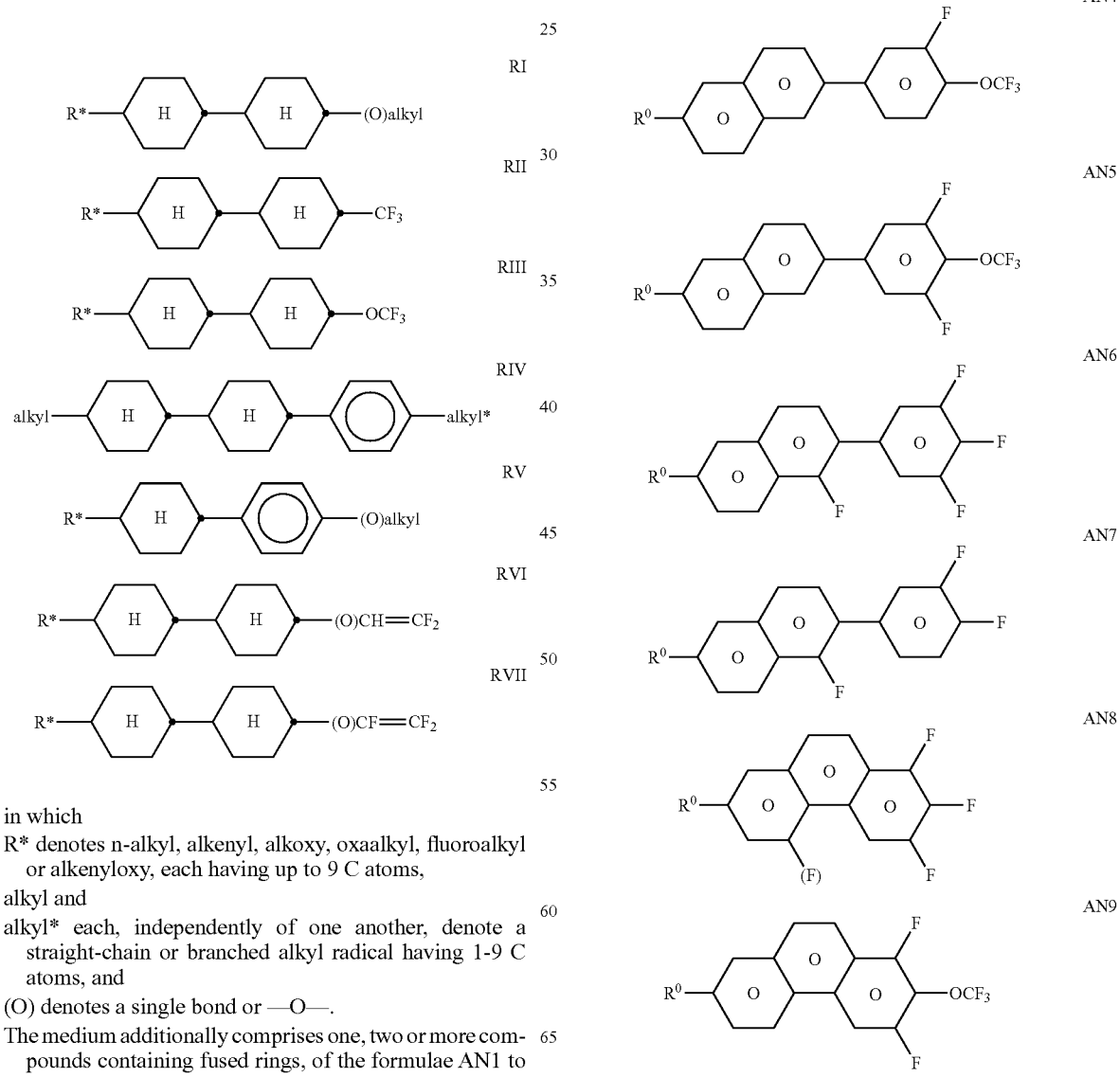

in which
R* denotes n-alkyl, alkenyl, alkoxy, oxaalkyl, fluoroalkyl or alkenyloxy, each having up to 9 C atoms,
alkyl and
alkyl* each, independently of one another, denote a straight-chain or branched alkyl radical having 1-9 C atoms, and
(O) denotes a single bond or —O—.
The medium additionally comprises one, two or more compounds containing fused rings, of the formulae AN1 to AN11:

AN10
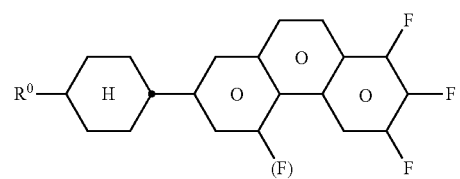
AN11
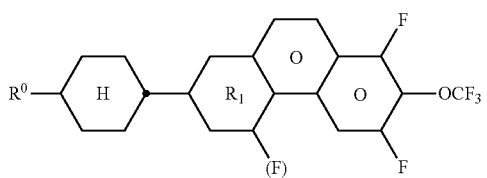
in which $R^0$ has the meanings indicated above;
The medium additionally comprises one or more pyran compounds of the formulae P-1 to P-11:
P-1
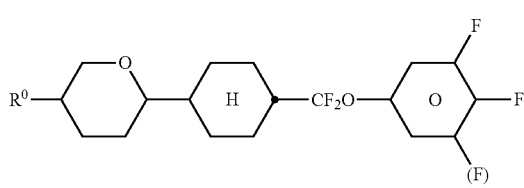
P-2
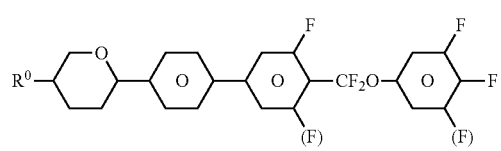
P-3
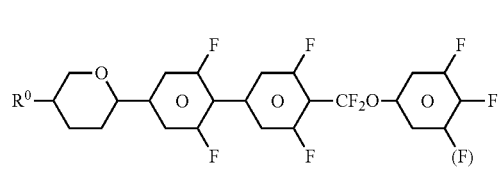
P-4
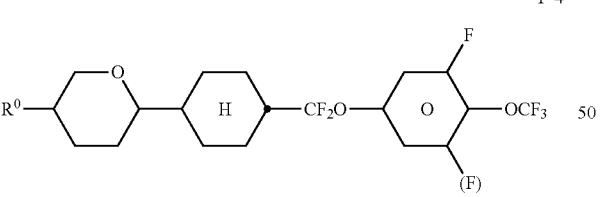
P-5
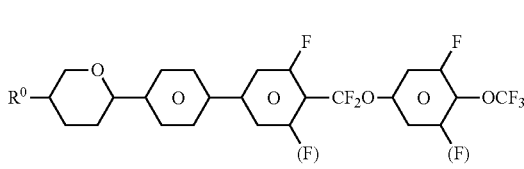
P-6
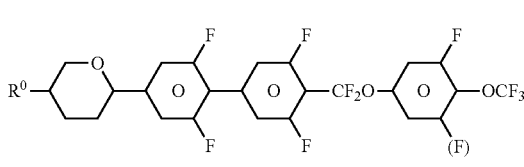
P-7
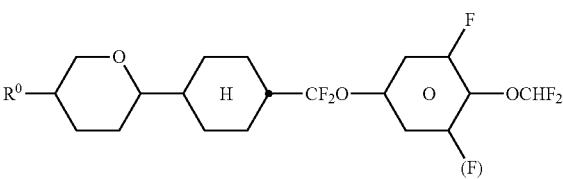
P-8
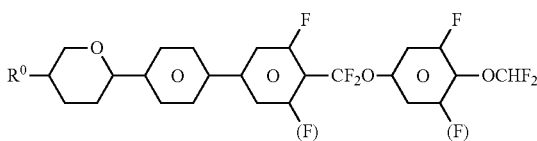
P-9
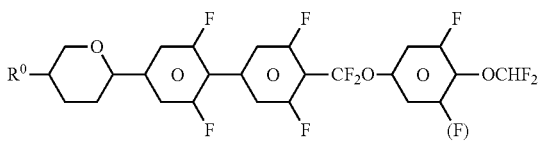
P-9
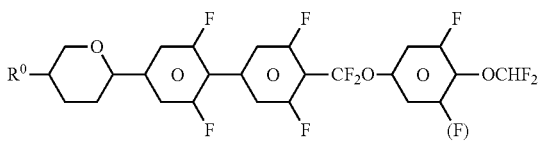
P-10
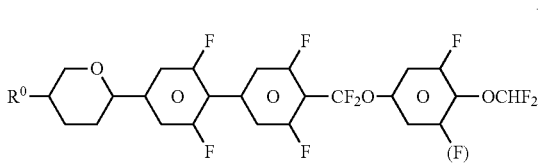
P-11
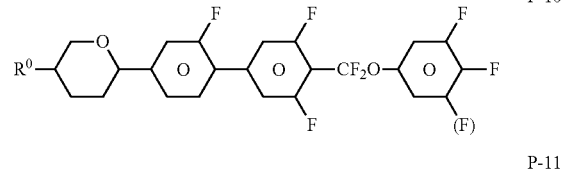
in which $R^0$ has the meanings indicated above.
The medium comprises one or more compounds selected from the formulae P-1, H15 and P-5:
P-1
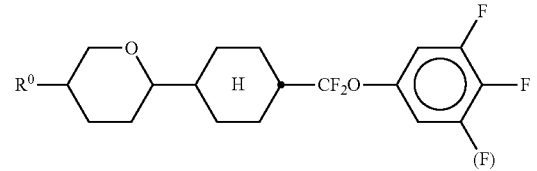
H15
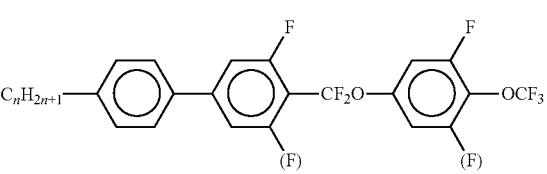

-continued

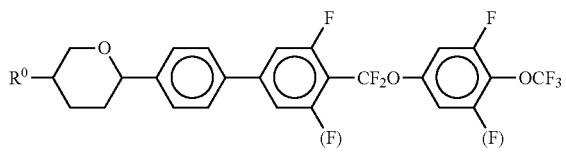
P-5

The proportion of these compounds in total is particularly preferably 5 to 50% by weight.

The medium preferably comprises one or more dioxane compounds of the formulae D-1 and/or D-2:

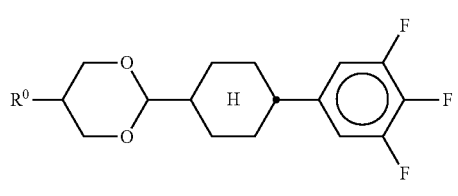
D-1

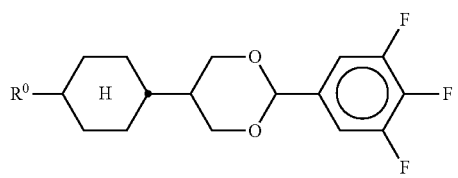
D-2 in which
$R^0$ has the meanings indicated above.
Preferred mixtures comprise 2-40% of dioxanes.

The term "alkyl" or "alkyl*" covers straight-chain and branched alkyl groups having 1-7 carbon atoms, in particular the straight-chain groups methyl, ethyl, propyl, butyl, pentyl, hexyl and heptyl. Groups having 2-5 carbon atoms are generally preferred.

The term "alkenyl" covers straight-chain and branched alkenyl groups having 2-7 carbon atoms, in particular the straight-chain groups. Preferred alkenyl groups are $C_2$-$C_7$-1E-alkenyl, $C_4$-$C_7$-3E-alkenyl, $C_5$-$C_7$-4-alkenyl, $C_6$-$C_7$-5-alkenyl and $C_7$-6-alkenyl, in particular $C_2$-$C_7$-1E-alkenyl, $C_4$-$C_7$-3E-alkenyl and $C_5$-$C_7$-4-alkenyl. Examples of particularly preferred alkenyl groups are vinyl, 1E-propenyl, 1E-butenyl, 1E-pentenyl, 1E-hexenyl, 1E-heptenyl, 3-butenyl, 3E-pentenyl, 3E-hexenyl, 3E-heptenyl, 4-pentenyl, 4Z-hexenyl, 4E-hexenyl, 4Z-heptenyl, 5-hexenyl, 6-heptenyl and the like. Groups having up to 5 carbon atoms are generally preferred.

The term "fluoroalkyl" preferably covers straight-chain groups having a terminal fluorine, i.e. fluoromethyl, 2-fluoroethyl, 3-fluoropropyl, 4-fluorobutyl, 5-fluoropentyl, 6-fluorohexyl and 7-fluoroheptyl. However, other positions of the fluorine are not excluded.

The term "oxaalkyl" preferably covers straight-chain radicals of the formula $C_nH_{2n+1}$—O—$(CH_2)_m$, in which n and m each, independently of one another, denote 1 to 6. Preferably, n=1 and m is 1 to 6.

It has been found that even a relatively small proportion of compounds of the formulae I and IA/IB mixed with conventional liquid-crystal materials, but in particular with one or more compounds of the formulae II, III, IV, V and/or VI, results in a significant lowering of the threshold voltage and in high values for the VHR (100° C.), with broad nematic phases with low smectic-nematic transition temperatures being observed at the same time, improving the shelf life. Preference is given, in particular, to mixtures which, besides one or more compounds of the formulae I and IA/IB, comprise one or more compounds of the formula IV, in particular compounds of the formula IVa in which $X^0$ denotes F or $OCF_3$. The compounds of the formulae IA/IB and I to VI are colourless, stable and readily miscible with one another and with other liquid-crystal materials.

The optimum mixing ratio of the compounds of the formulae I, IA, IB and II+III+IV+V+VI depends substantially on the desired properties, on the choice of the components of the formulae I, IA, IB, II, III, IV, V and/or VI and on the choice of any further components that may be present.

Suitable mixing ratios within the range given above can easily be determined from case to case by reference to the substance data for the individual components.

The total amount of compounds of the formulae IA/IB and I to XI in the mixtures according to the invention is not crucial. The mixtures can therefore comprise one or more further components for the purposes of optimisation of various properties. However, the observed effect on the addressing times and the threshold voltage is generally greater, the higher the total concentration of compounds of the formulae IA/IB and I to XI.

In a particularly preferred embodiment, the media according to the invention comprise compounds of the formulae II to VI (preferably II, III and/or IV, in particular IVa) in which $X^0$ denotes F, $OCF_3$, $OCHF_2$, $OCH=CF_2$, $OCF=CF_2$ or $OCF_2$—$CF_2H$. A favourable synergistic effect with the compounds of the formulae I and IA/IB results in particularly advantageous properties. In particular, mixtures comprising compounds of the formulae I, IA, IB and of the formula IVa are distinguished by their low threshold voltages.

The individual compounds of the formulae IA/IB and I to XVIII and their sub-formulae which can be used in the media according to the invention are either known or can be prepared analogously to the known compounds.

The construction of the MLC display according to the invention from polarisers, electrode base plates and surface-treated electrodes corresponds to the usual design for displays of this type. The term usual design is broadly drawn here and also covers all derivatives and modifications of the MLC display, in particular including matrix display elements based on poly-Si TFTs or MIM.

A significant difference between the displays according to the invention and the hitherto conventional displays based on the twisted nematic cell consists, however, in the choice of the liquid-crystal parameters of the liquid-crystal layer.

The liquid-crystal mixtures which can be used in accordance with the invention are prepared in a manner conventional per se. In general, the desired amount of the components used in lesser amount is dissolved in the components making up the principal constituent, advantageously at elevated temperature. It is also possible to mix solutions of the components in an organic solvent, for example in acetone, chloroform or methanol, and to remove the solvent again, for example by distillation, after thorough mixing.

The dielectrics may also comprise further additives known to the person skilled in the art and described in the literature, such as, for example, stabilisers, UV filters and antioxidants. For example, 0-15% of pleochroic dyes or chiral dopants can be added.

The invention therefore additionally relates to a process for the preparation of a liquid-crystalline medium as described above and below, which is characterised in that one or more of the compounds of the formula I and one or more compounds selected from the formulae IA and IB are mixed with further liquid-crystalline co-components, and additives are optionally added.

Further combinations of the embodiments and variants of the invention are evident from the claims.

In the present application and in the examples below, the structures of the liquid-crystal compounds are indicated by means of acronyms, the trans-formation into chemical formulae taking place in accordance with Tables A and B below. All radicals $C_nH_{2n+1}$ and $C_mH_{2m+1}$ are straight-chain alkyl radicals having n and m C atoms respectively; n and m are integers and preferably denote 0, 1, 2, 3, 4, 5, 6, 7, 8, 9, 10, 11 or 12. The coding in Table B is self-evident. In Table A, only the acronym for the parent structure is indicated. In individual cases, the acronym for the parent structure is followed, separated by a dash, by a code for the substituents $R^{1*}$, $R^{2*}$, $L^{1*}$, $L^{2*}$ and $L^{3*}$:

| Code for $R^{1*}$, $R^{2*}$, $L^{1*}$, $L^{2*}$, $L^{3*}$ | $R^{1*}$ | $R^{2*}$ | $L^{1*}$ | $L^{2*}$ | $L^{3*}$ |
|---|---|---|---|---|---|
| nm | $C_nH_{2n+1}$ | $C_mH_{2m+1}$ | H | H | H |
| nOm | $C_nH_{2n+1}$ | $OC_mH_{2m+1}$ | H | H | H |
| nO•m | $OC_nH_{2n+1}$ | $C_mH_{2m+1}$ | H | H | H |
| n | $C_nH_{2n+1}$ | CN | H | H | H |
| nN•F | $C_nH_{2n+1}$ | CN | H | H | F |
| nN•F•F | $C_nH_{2n+1}$ | CN | H | F | F |
| nF | $C_nH_{2n+1}$ | F | H | H | H |
| nOF | $OC_nH_{2n+1}$ | F | H | H | H |
| nF•F | $C_nH_{2n+1}$ | F | H | H | F |
| nmF | $C_nH_{2n+1}$ | $C_mH_{2m+1}$ | F | H | H |
| nOCF$_3$ | $C_nH_{2n+1}$ | OCF$_3$ | H | H | H |
| nOCF$_3$•F | $C_nH_{2n+1}$ | OCF$_3$ | F | H | H |
| n-Vm | $C_nH_{2n+1}$ | —CH=CH—$C_mH_{2m+1}$ | H | H | H |
| nV-Vm | $C_nH_{2n+1}$—CH=CH— | —CH=CH—$C_mH_{2m+1}$ | H | H | H |

Preferred mixture components are given in Tables A and B.

TABLE A

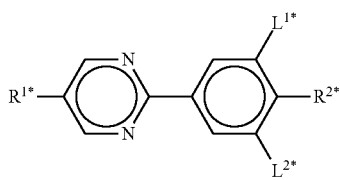

PYP

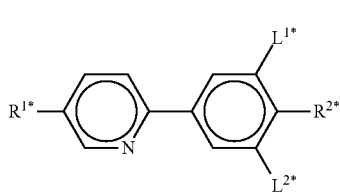

PYRP

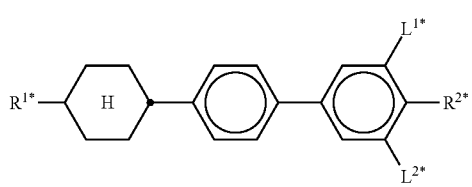

BCH

TABLE A-continued

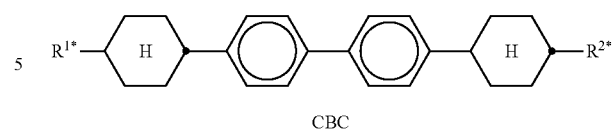

CBC

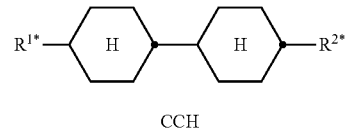

CCH

TABLE A-continued

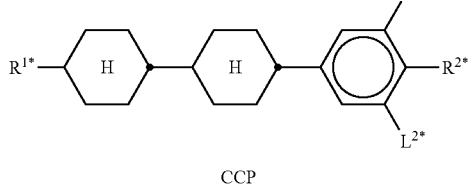

CCP

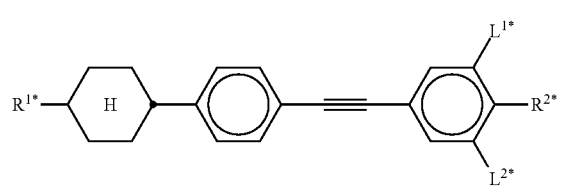

CPTP

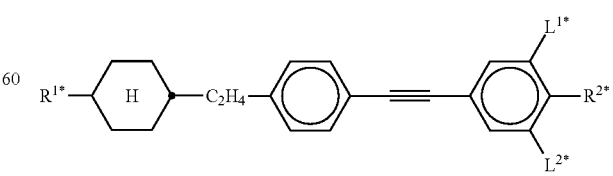

CEPTP

TABLE A-continued
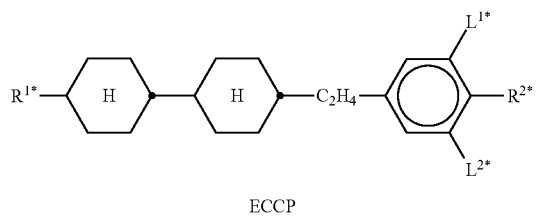
ECCP
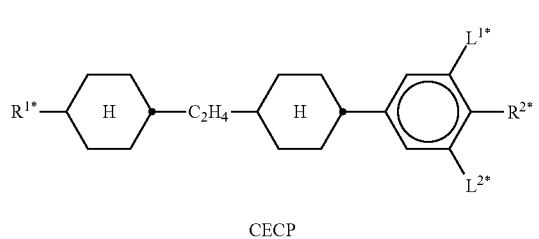
CECP
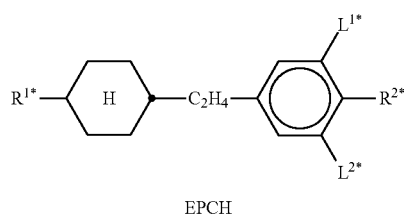
EPCH
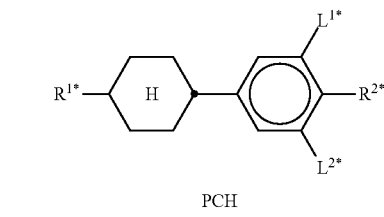
PCH
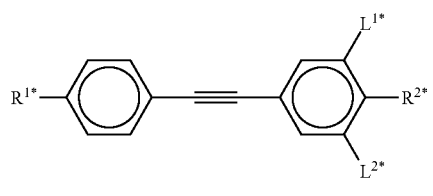
PTP
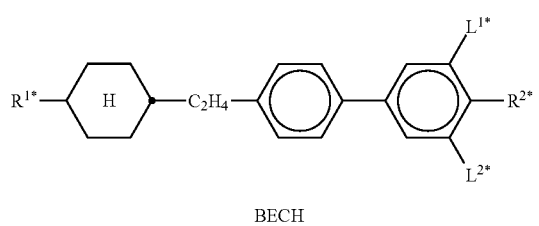
BECH
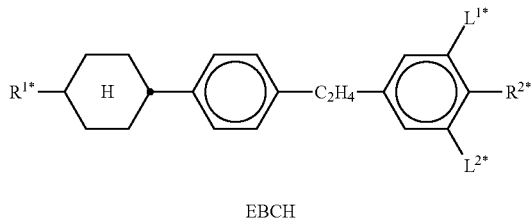
EBCH
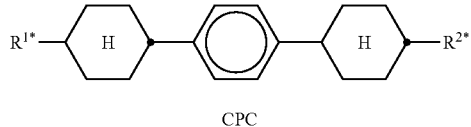
CPC
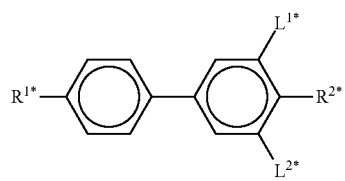
B
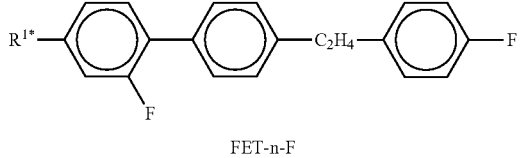
FET-n-F
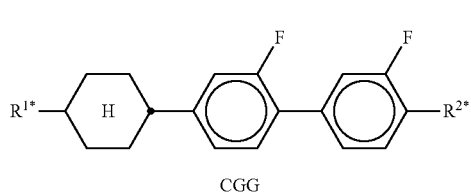
CGG
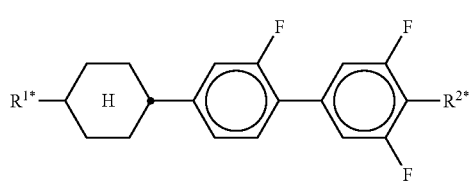
CGU
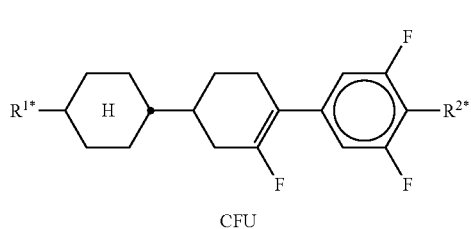
CFU TABLE B
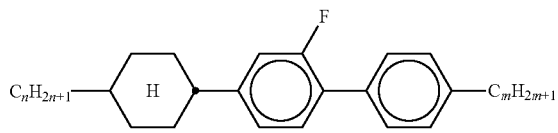
BCH-n.Fm
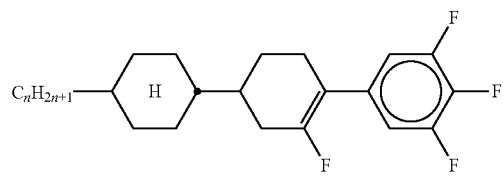
CFU-n-F
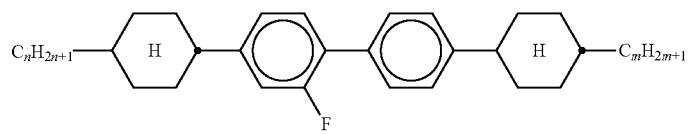
CBC-nmF
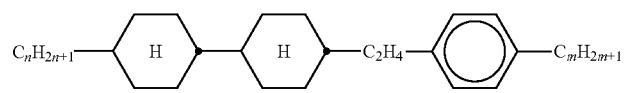
ECCP-nm
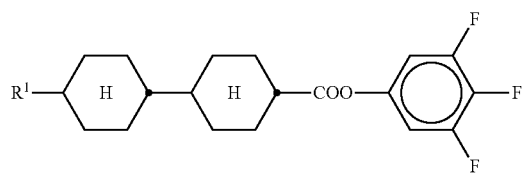
CCZU-n-F
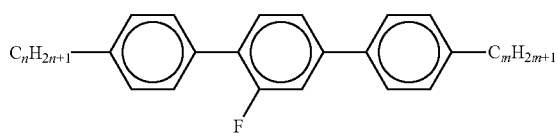
T-nFm
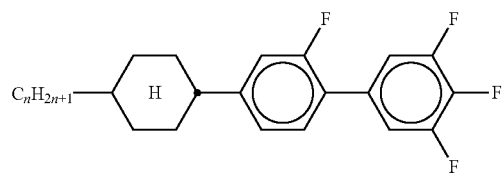
CGU-n-F
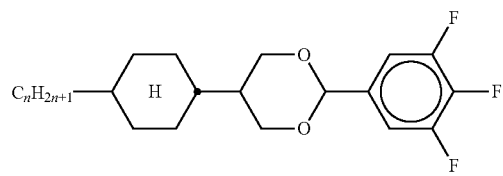
CDU-n-F TABLE B-continued
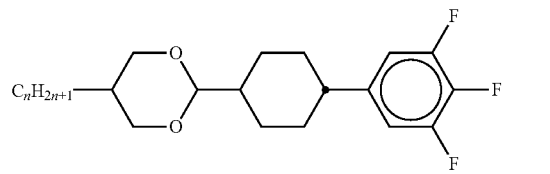
DCU-n-F
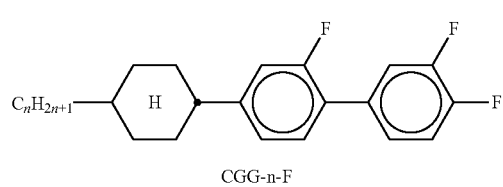
CGG-n-F
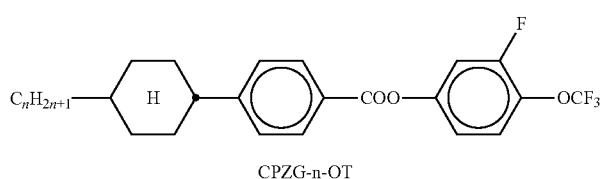
CPZG-n-OT
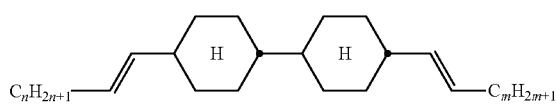
CC-nV-Vm
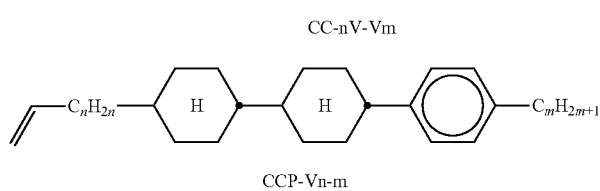
CCP-Vn-m
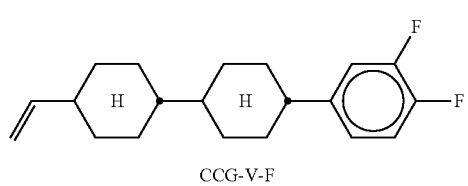
CCG-V-F
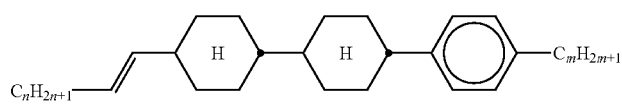
CCP-nV-m
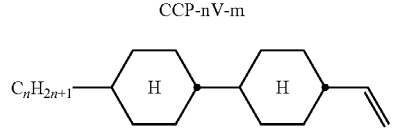
CC-n-V
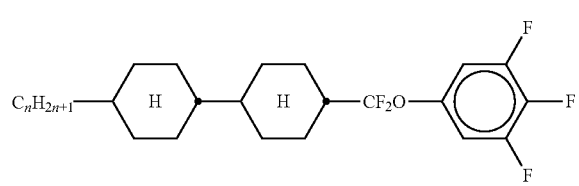
CCQU-n-F TABLE B-continued
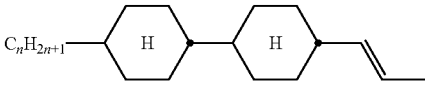
CC-n-V1
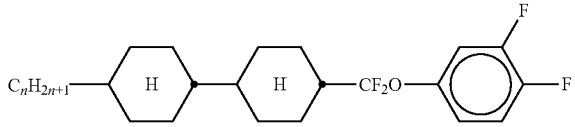
CCQG-n-F
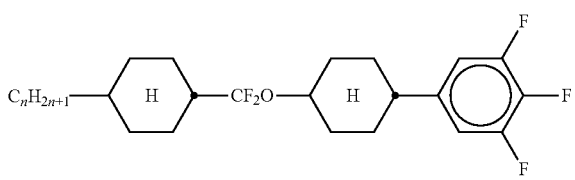
CQCU-n-F
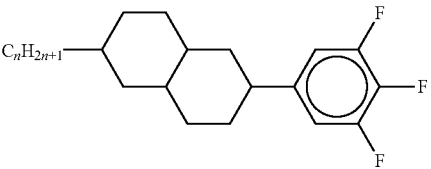
Dec-U-n-F
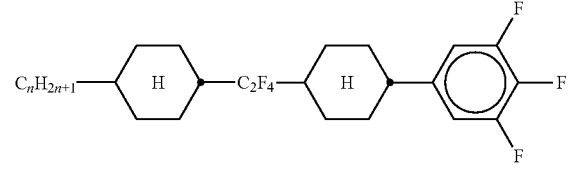
CWCU-n-F
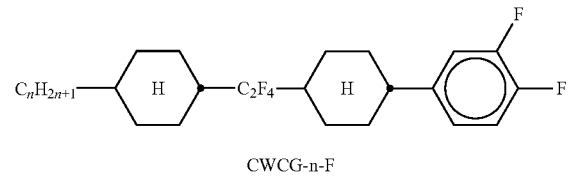
CWCG-n-F
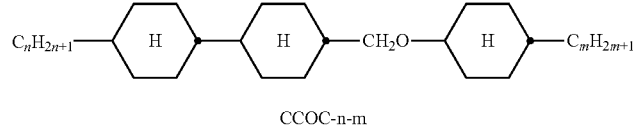
CCOC-n-m
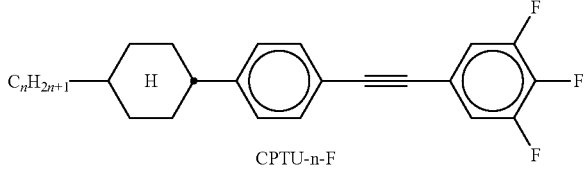
CPTU-n-F TABLE B-continued
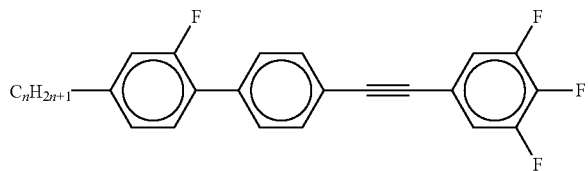
GPTU-n-F
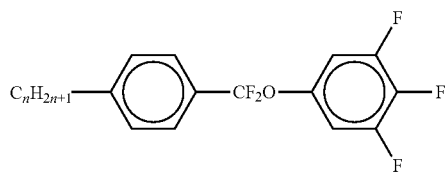
PQU-n-F
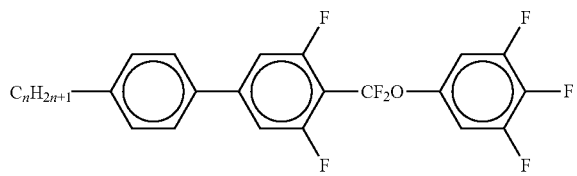
PUQU-n-F
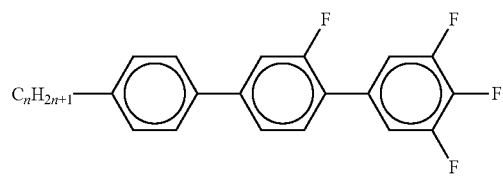
PGU-n-F
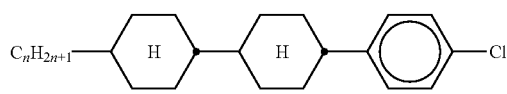
CCP-nCl
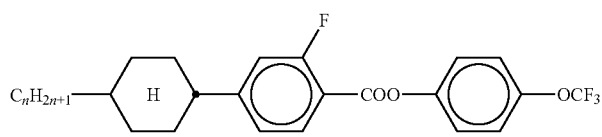
CGZP-n-OT
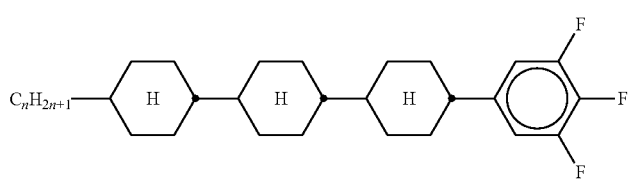
CCCU-n-F TABLE B-continued
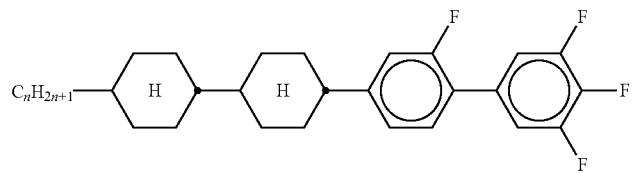
CCGU-n-F
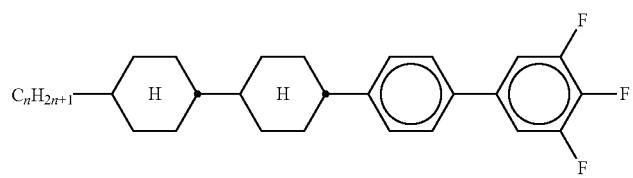
CCPU-n-F
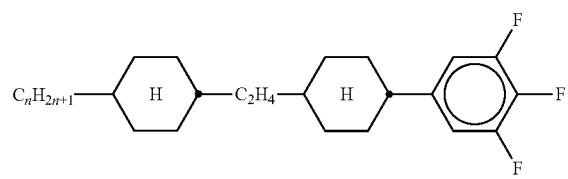
CECU-n-F
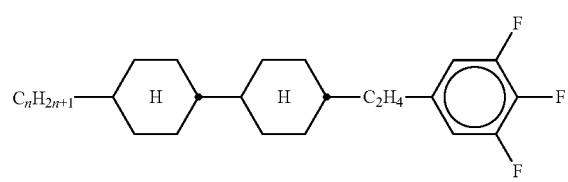
CCEU-n-F
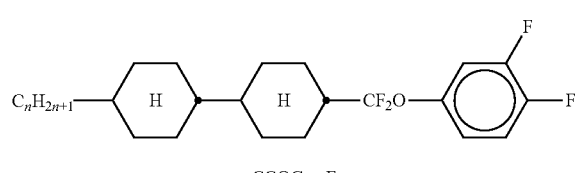
CCQG-n-F
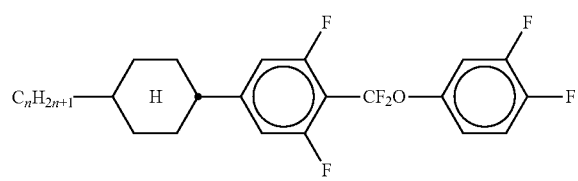
CUQG-n-F
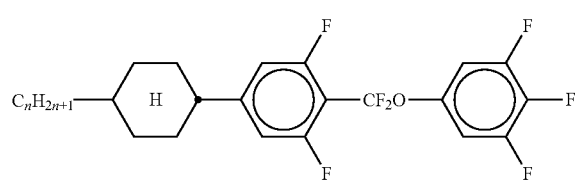
CUQU-n-F TABLE B-continued
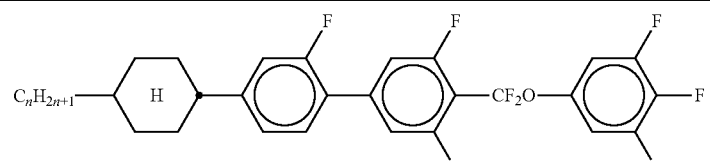
CGUQU-n-F
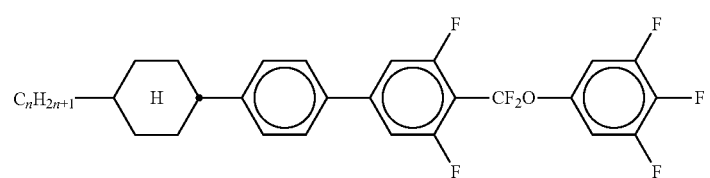
CPUQU-n-F
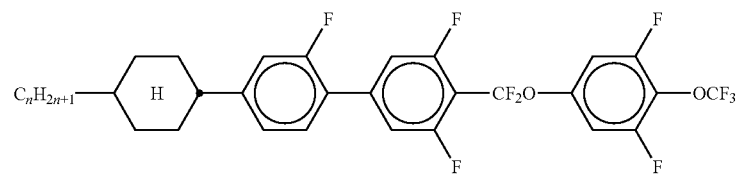
CGUQU-n-OT
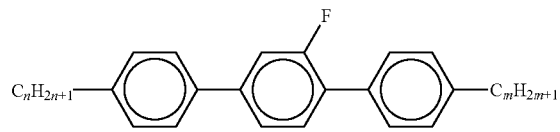
PGP-n-m
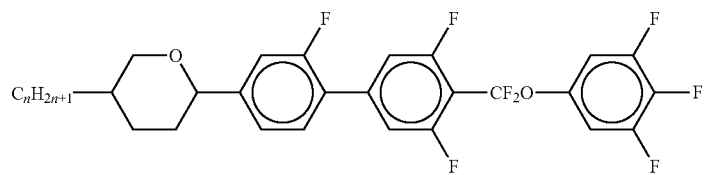
AGUQU-n-F
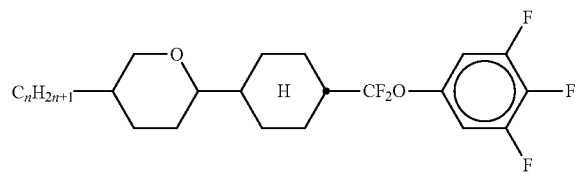
ACQU-n-F
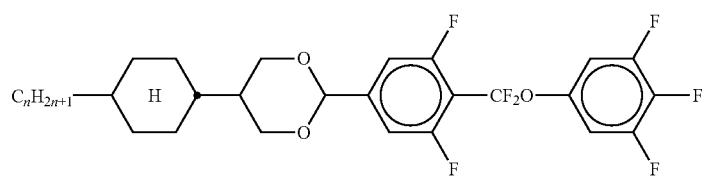
CDUQU-n-F Particular preference is given to liquid-crystalline mixtures which, besides the compounds of the formulae I and IA/IB, comprise at least one, two, three or four compounds from Table B.
Table C shows possible dopants which are generally added to the mixtures according to the invention.
TABLE C
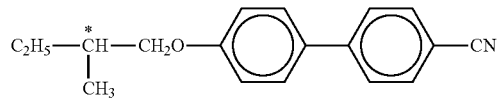
C 15
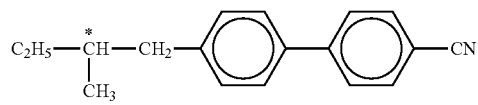
CB 15
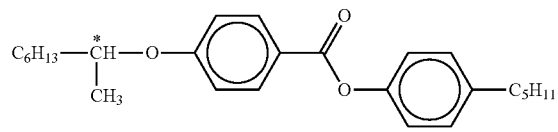
CM 21
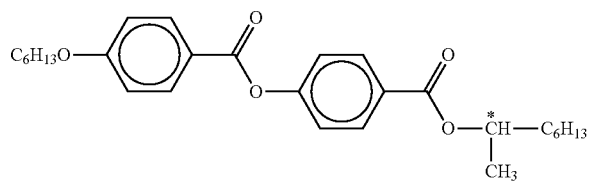
R/S-811
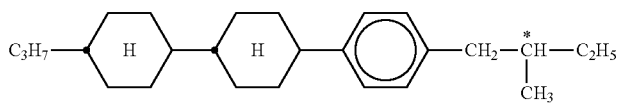
CM 44
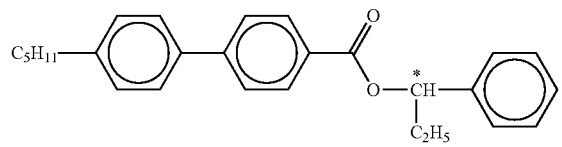
CM 45
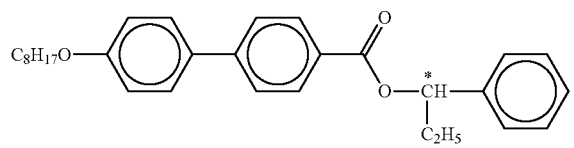
CM 47

TABLE C-continued
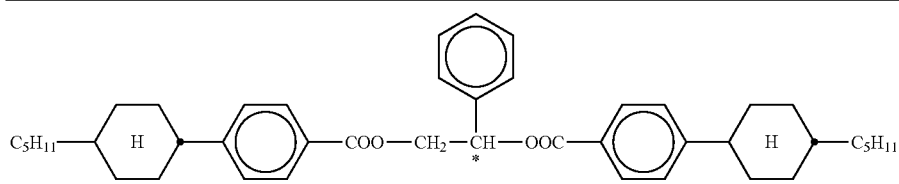
R/S-1011
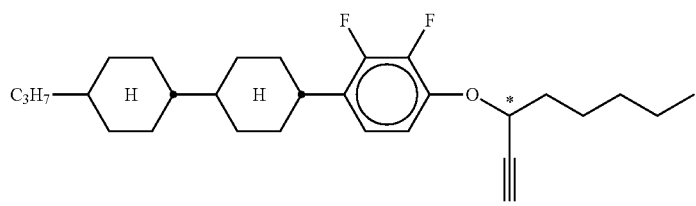
R/S-3011
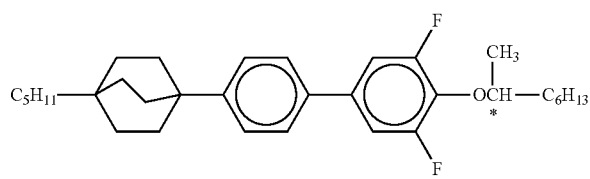
R/S-4011
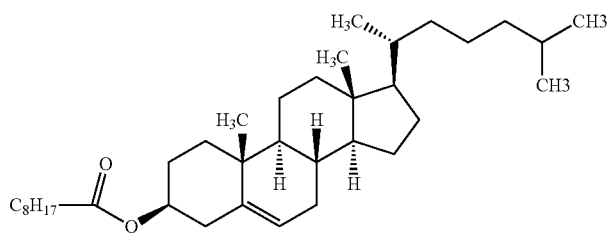
CN
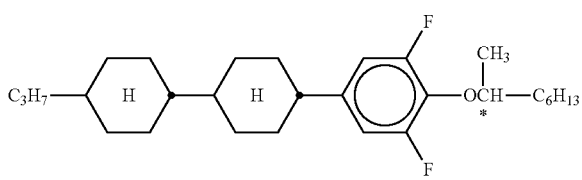
R/S-2011
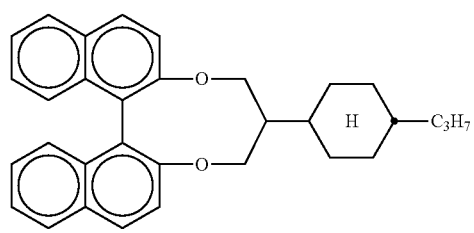
R/S-5011

Stabilisers which can be added, for example, to the mixtures according to the invention are mentioned below.
TABLE D
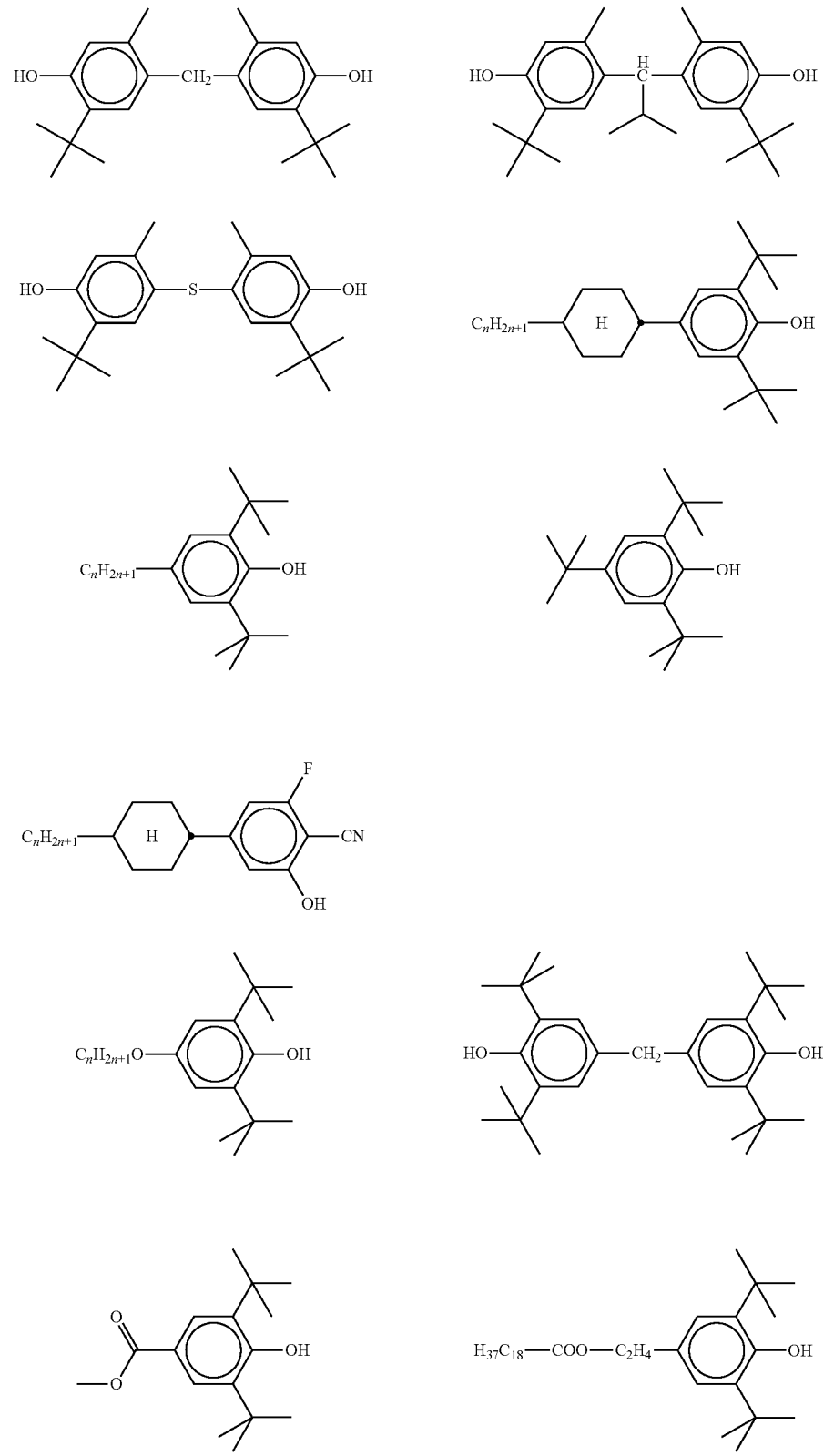

TABLE D-continued
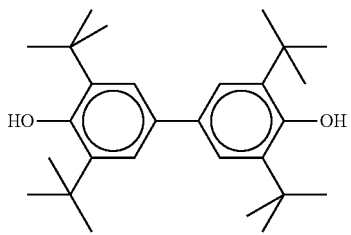
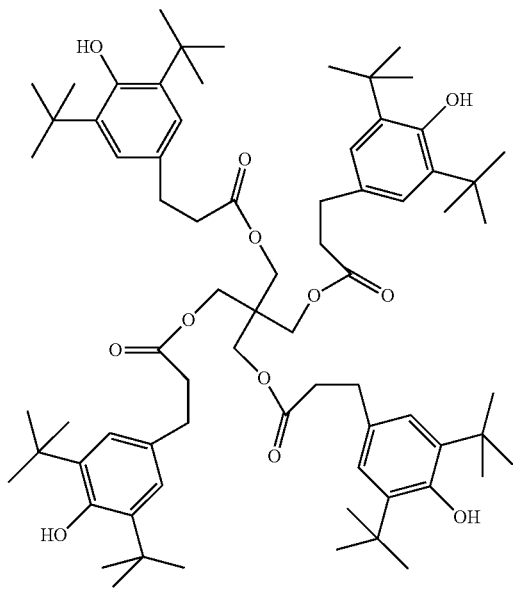 [SMILES: CC(C)(C)c1cc(CCC(=O)OCC(COC(=O)CCc2cc(C(C)(C)C)c(O)c(C(C)(C)C)c2)(COC(=O)CCc2cc(C(C)(C)C)c(O)c(C(C)(C)C)c2)COC(=O)CCc2cc(C(C)(C)C)c(O)c(C(C)(C)C)c2)cc(C(C)(C)C)c1O]
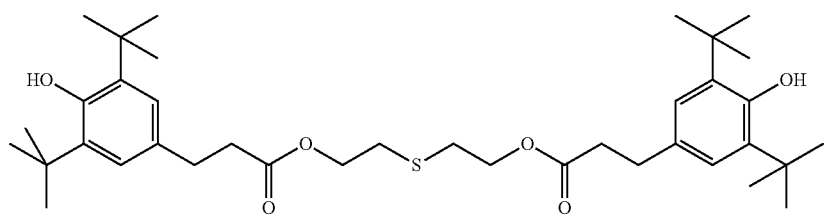 [SMILES: CC(C)(C)c1cc(CCC(=O)OCCSCCOC(=O)CCc2cc(C(C)(C)C)c(O)c(C(C)(C)C)c2)cc(C(C)(C)C)c1O]
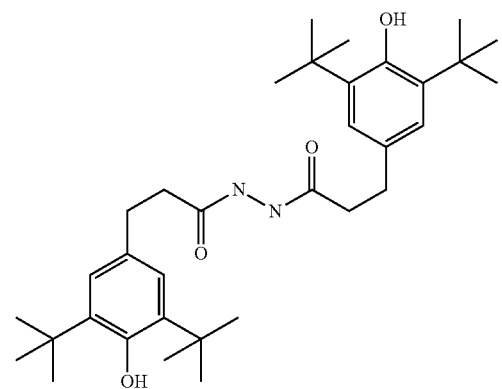 [SMILES: CC(C)(C)c1cc(CCC(=O)NNC(=O)CCc2cc(C(C)(C)C)c(O)c(C(C)(C)C)c2)cc(C(C)(C)C)c1O]
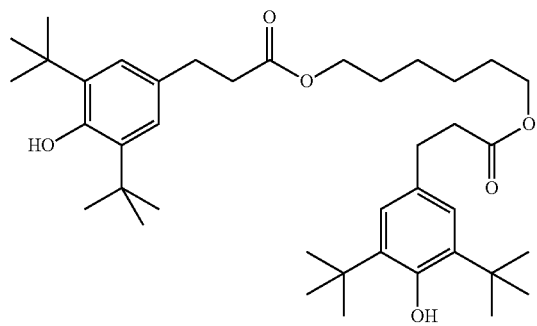 [SMILES: CC(C)(C)c1cc(CCC(=O)OCCCCCCOC(=O)CCc2cc(C(C)(C)C)c(O)c(C(C)(C)C)c2)cc(C(C)(C)C)c1O]

TABLE D-continued
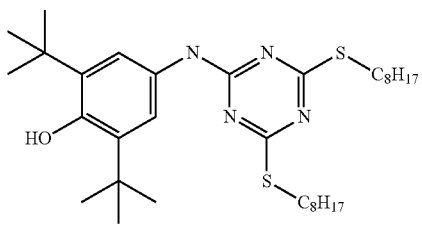
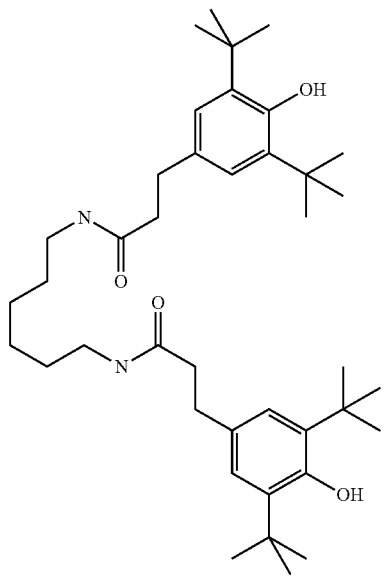 [SMILES: CC(C)(C)c1cc(CCC(=O)NCCCCCCNC(=O)CCc2cc(C(C)(C)C)c(O)c(C(C)(C)C)c2)cc(C(C)(C)C)c1O]
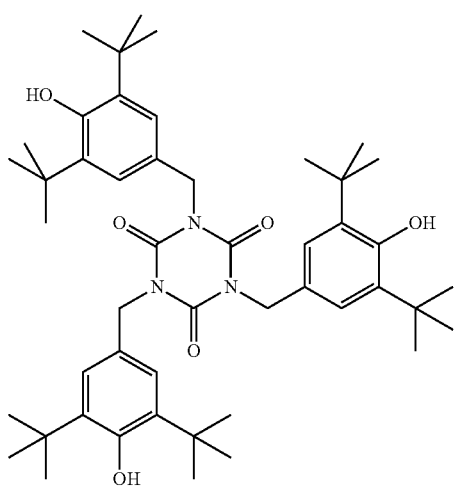 [SMILES: CC(C)(C)c1cc(Cn2c(=O)n(Cc3cc(C(C)(C)C)c(O)c(C(C)(C)C)c3)c(=O)n(Cc3cc(C(C)(C)C)c(O)c(C(C)(C)C)c3)c2=O)cc(C(C)(C)C)c1O]
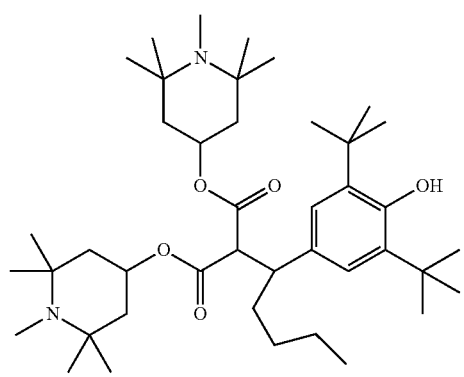 [SMILES: CCCCC(c1cc(C(C)(C)C)c(O)c(C(C)(C)C)c1)C(C(=O)OC1CC(C)(C)N(C)C(C)(C)C1)C(=O)OC1CC(C)(C)N(C)C(C)(C)C1]
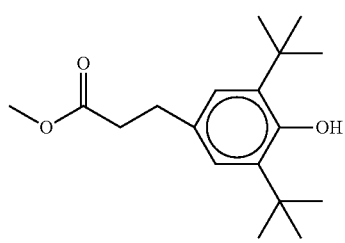
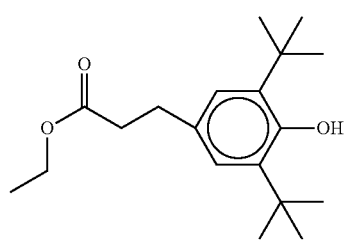
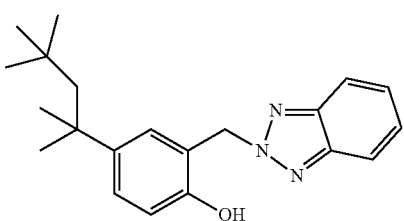 [SMILES: CC(C)(C)CC(C)(C)c1ccc(O)c(Cn2nc3ccccc3n2)c1]
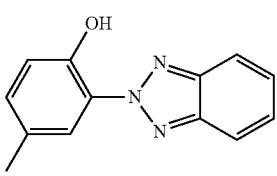 [SMILES: Cc1ccc(O)c(-n2nc3ccccc3n2)c1]

TABLE D-continued
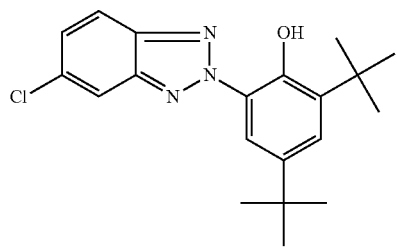 [SMILES: CC(C)(C)c1cc(-n2nc3ccc(Cl)cc3n2)c(O)c(C(C)(C)C)c1] 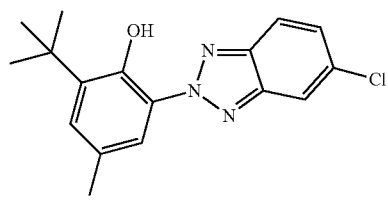 [SMILES: Cc1cc(-n2nc3ccc(Cl)cc3n2)c(O)c(C(C)(C)C)c1]
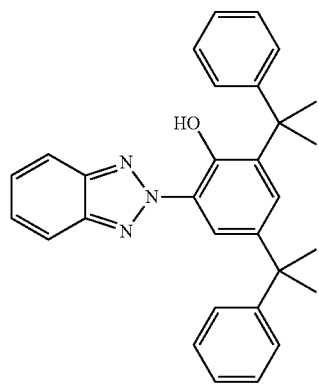 [SMILES: CC(C)(c1ccccc1)c1cc(-n2nc3ccccc3n2)c(O)c(C(C)(C)c2ccccc2)c1] 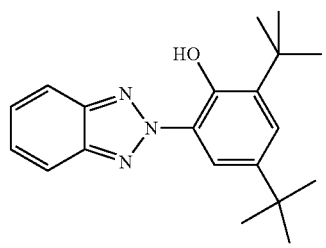 [SMILES: CC(C)(C)c1cc(-n2nc3ccccc3n2)c(O)c(C(C)(C)C)c1]
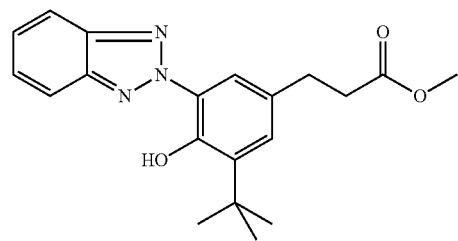 [SMILES: COC(=O)CCc1cc(-n2nc3ccccc3n2)c(O)c(C(C)(C)C)c1] 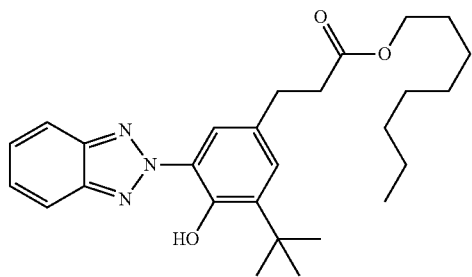 [SMILES: CCCCCCCCOC(=O)CCc1cc(-n2nc3ccccc3n2)c(O)c(C(C)(C)C)c1]

TABLE D-continued

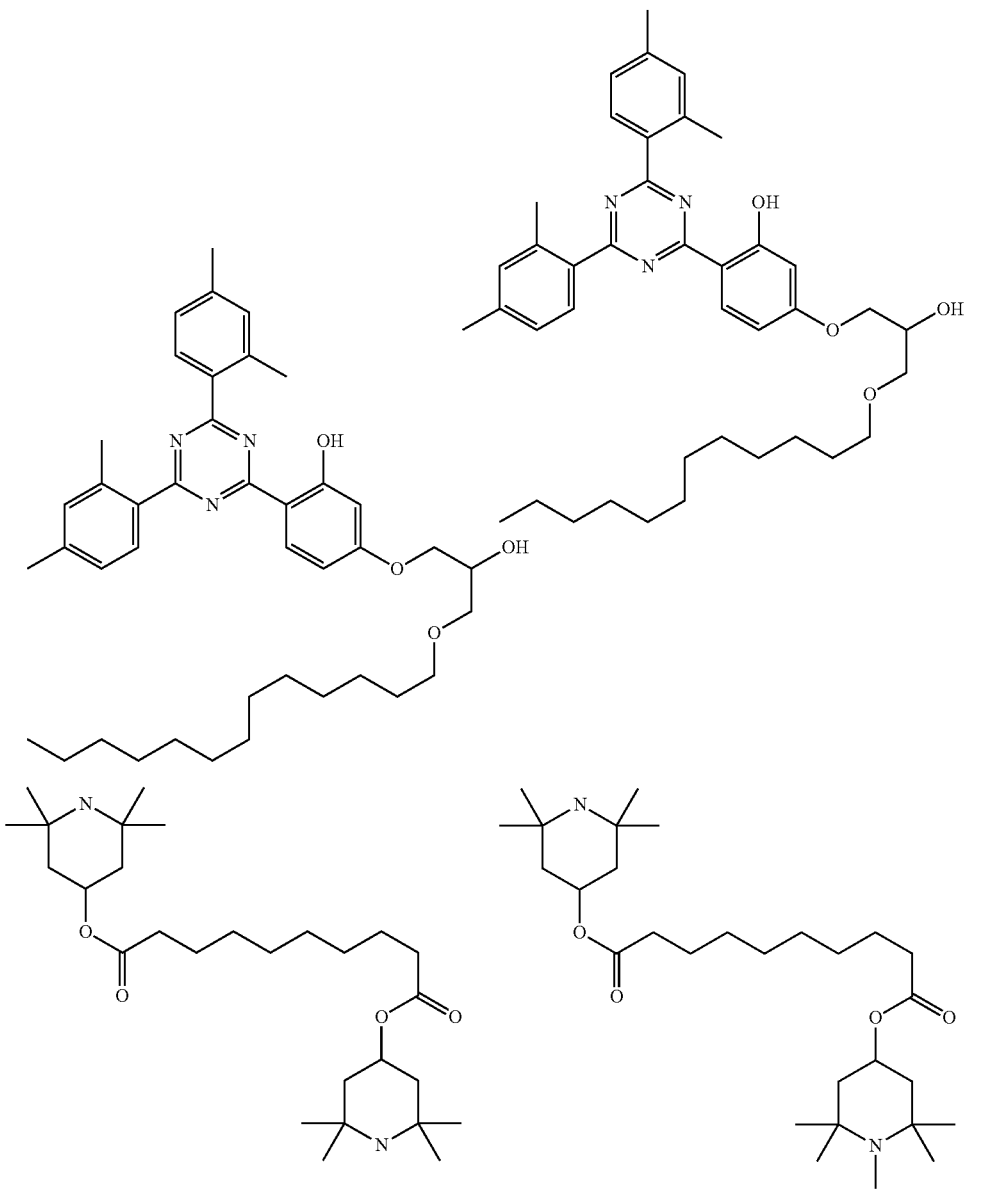

The following examples are intended to explain the invention without limiting it. The person skilled in the art will be able to glean from the examples details on the procedure which are not mentioned specifically in the general description, generalise these details in accordance with general expert knowledge and apply them to his specific problem.

Above and below, percentages denote percent by weight. All temperatures are indicated in degrees Celsius. Δn denotes optical anisotropy (589 nm, 20° C.), Δε denotes the dielectric anisotropy ($\Delta\varepsilon = \varepsilon_\| - \varepsilon_\perp$, where $\varepsilon_\|$ denotes the dielectric constant parallel to the longitudinal molecular axes and $\varepsilon_\perp$ denotes the dielectric constant perpendicular thereto). The rotational viscosity $\gamma_1$ (mPa·s) is determined at 20° C. $V_{10}$ denotes the voltage for 10% transmission (viewing direction perpendicular to the plate surface). $t_{on}$ denotes the switch-on time and $t_{off}$ the switch-off time at an operating voltage corresponding to 2.0 times the value of $V_{10}$. Δn denotes the optical anisotropy. The electro-optical data are measured in a TN cell at the 1st minimum (i.e. at a d·Δn value of 0.5 μm) at 20° C., unless expressly indicated otherwise.

EXAMPLE M1

| | | | |
|---|---|---|---|
| CCQG-2-F | 7% | Clearing point [° C.]: | 79 |
| CCQG-3-F | 7% | Δn [589 nm, 20° C.]: | 0.069 |
| CCQU-2-F | 13% | Δε [1 kHz, 20° C.]: | 16.2 |
| CCQU-3-F | 14% | $\gamma_1$ [mPa · s, 20° C.]: | 166 |
| CCQU-5-F | 13% | $V_{10}$ [V]: | 0.93 |
| ACQU-2-F | 18% | | |
| ACQU-5-F | 15% | | |
| PUQU-2-F | 4% | | |
| CC-4-V | 3% | | |
| CDUQU-3-F | 6% | | |

EXAMPLE M2

| | | | |
|---|---|---|---|
| CCQU-2-F | 13% | Clearing point [° C.]: | 87 |
| CCQU-3-F | 14% | Δn [589 nm, 20° C.]: | 0.078 |
| CCQU-5-F | 13% | Δε [1 kHz, 20° C.]: | 14.5 |
| ACQU-2-F | 8% | $\gamma_1$ [mPa·s, 20° C.]: | 137 |
| ACQU-5-F | 7% | $V_{10}$ [V]: | 1.07 |
| CDUQU-3-F | 10% | | |
| PUQU-2-F | 6% | | |
| CCGU-3-F | 8% | | |
| CC-4-V | 15% | | |
| CCG-V-F | 6% | | |

EXAMPLE M3

| | | | |
|---|---|---|---|
| CCQU-2-F | 12% | Clearing point [° C.]: | 83 |
| CCQU-3-F | 14% | Δn [589 nm, 20° C.]: | 0.078 |
| CCQU-5-F | 13% | Δε [1 kHz, 20° C.]: | 22.4 |
| ACQU-5-F | 33% | $\gamma_1$ [mPa·s, 20° C.]: | 230 |
| CDUQU-3-F | 15% | $V_{10}$ [V]: | 0.86 |
| PUQU-2-F | 4% | | |
| PUQU-3-F | 4% | | |
| CCG-V-F | 5% | | |

EXAMPLE M4

| | | | |
|---|---|---|---|
| CCP-3F.F.F | 7% | Clearing point [° C.]: | 89 |
| CCP-5F.F.F | 6% | Δn [589 nm, 20° C.]: | 0.070 |
| CCQU-2-F | 13% | Δε [1 kHz, 20° C.]: | 19.4 |
| CCQU-3-F | 14% | $V_{10}$ [V]: | 0.96 |
| CCQU-5-F | 13% | | |
| ACQU-2-F | 16% | | |
| ACQU-5-F | 16% | | |
| CDUQU-3-F | 11% | | |
| CCOC-4-3 | 4% | | |

EXAMPLE M5

| | | | |
|---|---|---|---|
| CCP-1F.F.F | 6% | Clearing point [° C.]: | 80.5 |
| CCP-2F.F.F | 8% | Δn [589 nm, 20° C.]: | 0.0805 |
| CCP-3F.F.F | 9% | Δε [1 kHz, 20° C.]: | 18.0 |
| CCP-5F.F.F | 5% | $\gamma_1$ [mPa·s, 20° C.]: | |
| PUQU-2-F | 6% | $V_{10}$ [V]: | 0.90 |
| PUQU-3-F | 5% | | |
| CCQU-2-F | 13% | | |
| CCQU-3-F | 14% | | |
| CCQU-5-F | 13% | | |
| CDUQU-3-F | 15% | | |
| CC-4-V | 4% | | |
| CCPC-33 | 2% | | |

EXAMPLE M6

| | | | |
|---|---|---|---|
| CC-4-V | 18% | Clearing point [° C.]: | 75.5 |
| CC-3-V1 | 8% | Δn [589 nm, 20° C.]: | 0.091 |
| CCQU-2-F | 13% | Δε [1 kHz, 20° C.]: | 14.6 |
| CCQU-3-F | 12% | $\gamma_1$ [mPa·s, 20° C.]: | 102 |
| CCQU-5-F | 10% | $V_{10}$ [V]: | 1.10 |
| PUQU-2-F | 8% | | |
| PUQU-3-F | 10% | | |
| PGP-2-3 | 4% | | |
| CDUQU-3-F | 12% | | |
| CCGU-3-F | 5% | | |

EXAMPLE M7

| | | | |
|---|---|---|---|
| CC-4-V | 18% | Clearing point [° C.]: | 82.5 |
| CC-3-V1 | 8% | Δn [589 nm, 20° C.]: | 0.093 |
| CCQU-2-F | 4% | Δε [1 kHz, 20° C.]: | 12.9 |
| CCQU-3-F | 11% | $\gamma_1$ [mPa·s, 20° C.]: | 102 |
| CCQU-5-F | 10% | $V_{10}$ [V]: | 1.20 |
| CCP-20CF3 | 6% | | |
| CCP-30CF3 | 6% | | |
| PUQU-2-F | 7% | | |
| PUQU-3-F | 9% | | |
| PGP-2-3 | 5% | | |
| CDUQU-3-F | 12% | | |
| CCGU-3-F | 4% | | |

The invention claimed is:

1. A liquid-crystalline medium, comprising one or more compounds of formula I

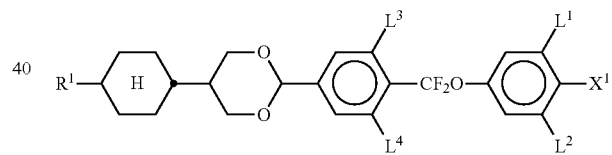

I and one or more compounds selected from the group of compounds of formulae IA and IB

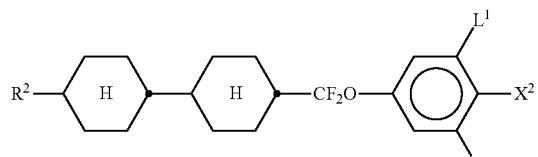

IA

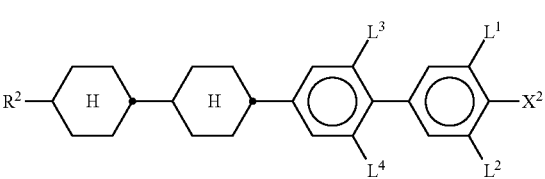

IB and one or more compounds of formulae RI to RVII:

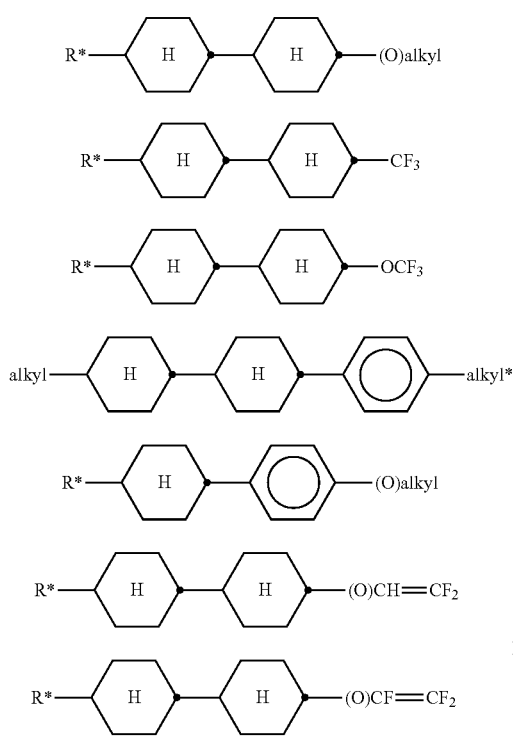

in which
R¹, R² each, independently of one another, denote H, a halogenated, CN-substituted or unsubstituted alkyl radical having 1 to 15 C atoms, in which one or more CH₂ groups are each optionally replaced, independently of one another, by —C≡C—, —CO—, —CH=CH—, —O—,

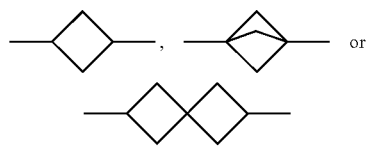

in such a way that O atoms are not linked directly to one another,
X¹, X² each, independently of one another, denote F, Cl, CN, SF₅, SCN, NCS, a halogenated alkyl radical, a halogenated alkenyl radical, a halogenated alkoxy radical or a halogenated alkenyloxy radical, each having up to 6 C atoms,
L¹⁻⁴ each, independently of one another, denote H or F,
R* denotes n-alkyl, alkenyl, alkoxy, oxaalkyl, fluoroalkyl or alkenyloxy, each having up to 9 C atoms,
alkyl and
alkyl* each, independently of one another, denote a straight-chain or branched alkyl radical having 1-9 C atoms, and
(O) denotes a single bond or —O—.

2. A liquid-crystalline medium according to claim 1, comprising one or more compounds of formulae I-1 to I-5:

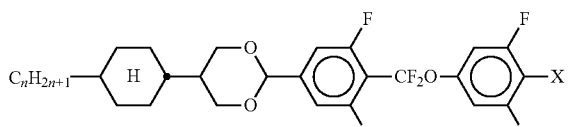

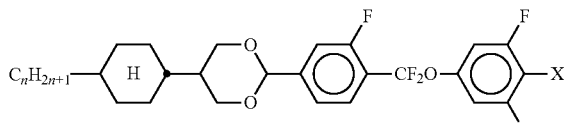

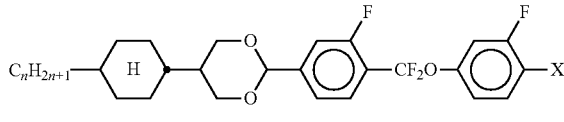

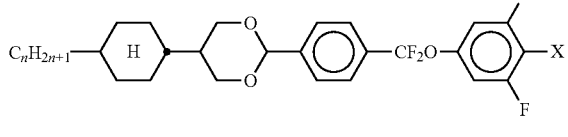

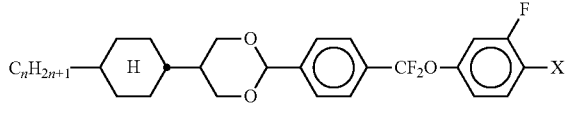

in which
X is F, Cl, CN, SF₅, SCN, NCS, a halogenated alkyl radical, a halogenated alkenyl radical, a halogenated alkoxy radical or a halogenated alkenyloxy radical, each having up to 6 C atoms, and
n denotes 1, 2, 3, 4, 5, 6 or 7.

3. A liquid-crystalline medium according to claim 1, comprising one or more compounds of formulae IA-1 to IA-4:

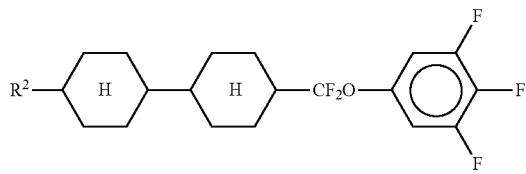

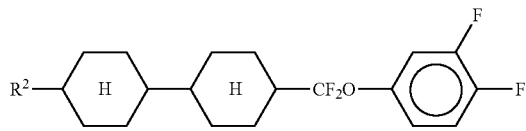

-continued

IA-3

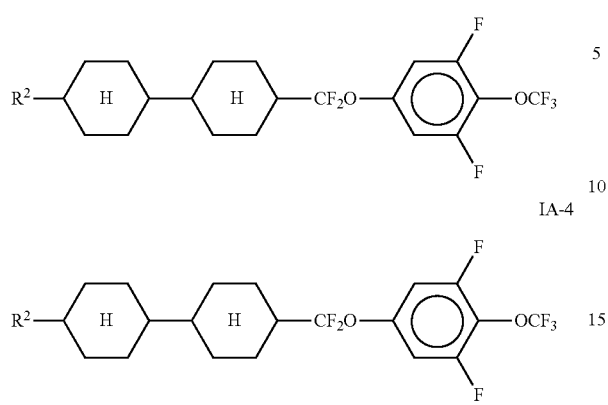

IA-4 in which

R² is H, a halogenated, CN-substituted or unsubstituted alkyl radical having 1 to 15 C atoms, in which one or more CH₂ groups are optionally replaced, independently of one another, by —C≡C—, —CO—, —CH═CH—, —O—,

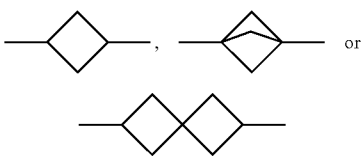 or in such a way that O atoms are not linked directly to one another.

4. A liquid-crystalline medium according to claim 1, comprising one or more compounds of formulae IB-1 to IB-4:

IB-1

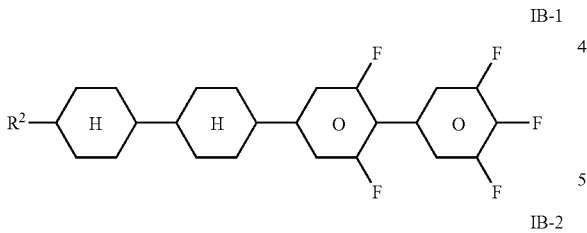

IB-2

IB-3

-continued

IB-4

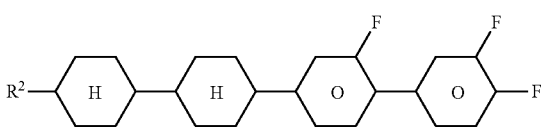

in which

R² is H, a halogenated, CN-substituted or unsubstituted alkyl radical having 1 to 15 C atoms, in which one or more CH₂ groups are optionally replaced, independently of one another, by —C≡C—, —CO—, —CH═CH—, —O—,

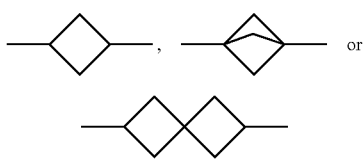 or in such a way that O atoms are not linked directly to one another.

5. A liquid-crystalline medium according to claim 1, further comprising one or more compounds selected from the group consisting of compounds of formulae II, III, IV, V and VI:

II

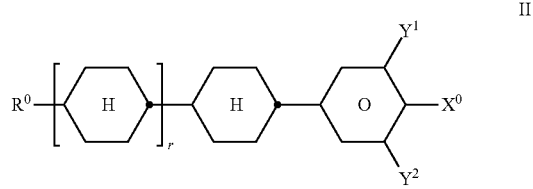

III

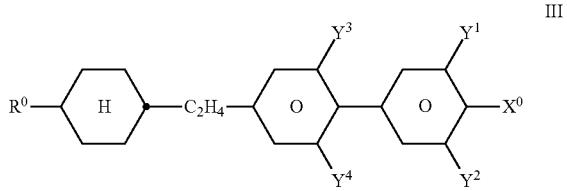

IV

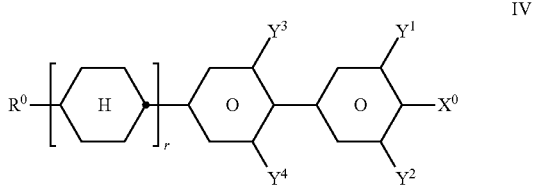

V

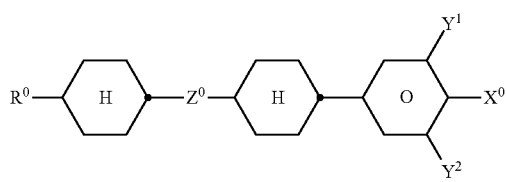

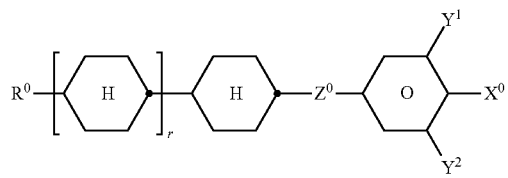

VI in which

R⁰ denotes H, n-alkyl, alkoxy, oxaalkyl, fluoroalkyl, alkenyloxy or alkenyl, each having up to 9 C atoms, X⁰ denotes F, Cl, halogenated alkyl, alkenyl, alkenyloxy or alkoxy having up to 6 C atoms, Z⁰ denotes —C₂F₄—, —CF=CF—, —CH=CF—, —CF=CH—, —C₂H₄—, —CH=CH—, —O(CH₂)₃—, —(CH₂)₃O—, —(CH₂)₄—, —CF₂O—, —OCF₂—, —OCH₂— or —CH₂O—, Y¹⁻⁴ each, independently of one another, denote H or F, and r denotes 0 or 1.

6. A liquid-crystalline medium according to claim 1, wherein the proportion of compounds of formulae IA/IB and I to VI together in the mixture as a whole is at least 50% by weight.

7. A liquid-crystalline medium according to claim 1, further comprising one or more compounds of formulae Ea to Ef:

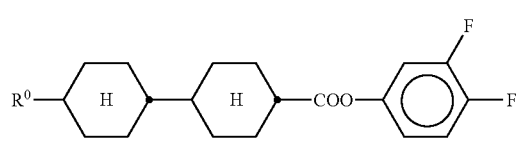

Ea

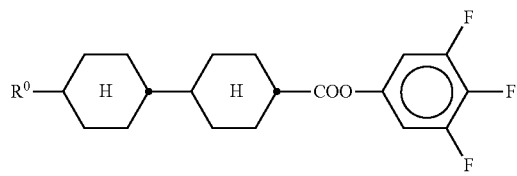

Eb

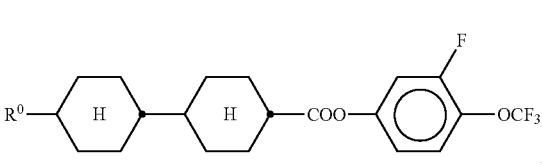

Ec

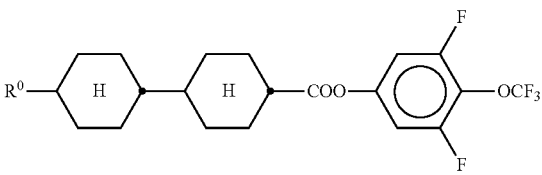

Ed

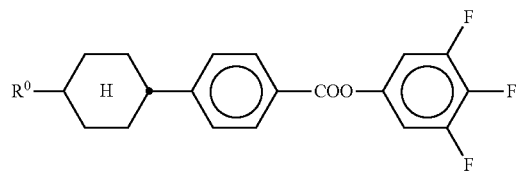

Ee

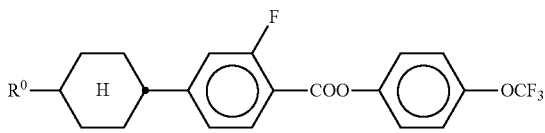

Ef in which

R⁰ denotes H, n-alkyl, alkoxy, oxaalkyl, fluoroalkyl, alkenyloxy or alkenyl, each having up to 9 C atoms.

8. A liquid-crystalline medium according to claim 1, comprising one or more compounds of the formulae IIa to IIg:

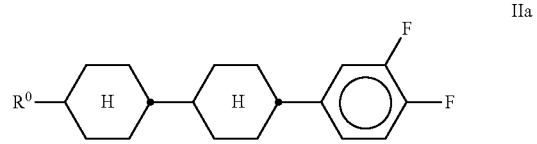

IIa

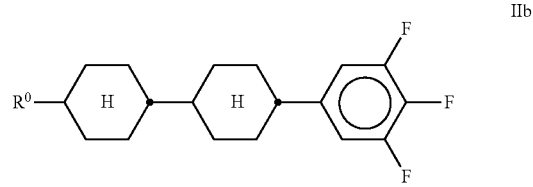

IIb

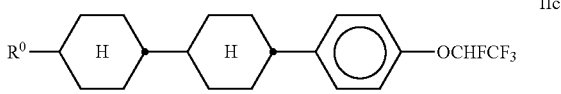

IIc

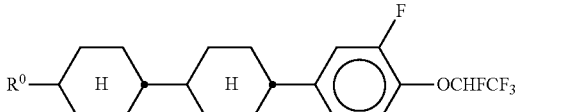

IId

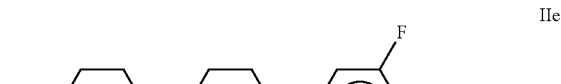

IIe

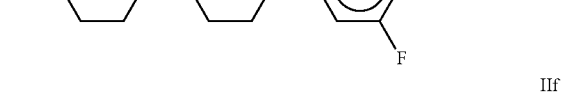

IIf

IIg in which

R⁰ denotes H, n-alkyl, alkoxy, oxaalkyl, fluoroalkyl, alkenyloxy or alkenyl, each having up to 9 C atoms.

9. A liquid-crystalline medium according to claim 1, comprising one or more compounds of formulae RI to RVII:

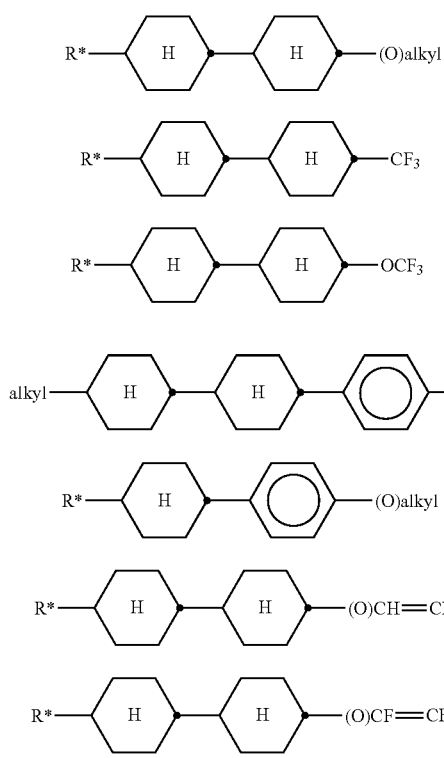

in which
R* denotes n-alkyl, alkenyl, alkoxy, oxaalkyl, fluoroalkyl or alkenyloxy, each having up to 9 C atoms,
alkyl and
alkyl* each, independently of one another, denote a straight-chain or branched alkyl radical having 1-9 C atoms, and
(O) denotes —O—.

10. A liquid-crystalline medium according to claim 1, wherein the proportion of compounds of formula I in the mixture as a whole is 5 to 40% by weight.

11. A method for achieving an electro-optical effect, comprising achieving said effect with a liquid-crystalline medium according to claim 1.

12. An electro-optical liquid-crystal display, containing a liquid-crystalline medium according to claim 1.

13. A process for preparing a liquid-crystalline medium according to claim 1, comprising mixing together one or more of the compounds of formula I and one or more compounds selected from the group of compounds of formulae IA and IB an optionally with further liquid-crystalline co-components, and additives.

14. A liquid-crystalline medium according to claim 2, wherein X denotes F or $OCF_3$.

15. A liquid-crystalline medium according to claim 1, comprising a compound of formula IA.

16. A liquid-crystalline medium according to claim 1, comprising a compound of formula IB.

17. A liquid-crystalline medium according to claim 3, comprising one or more compounds of formulae IB-1 to IB-4:

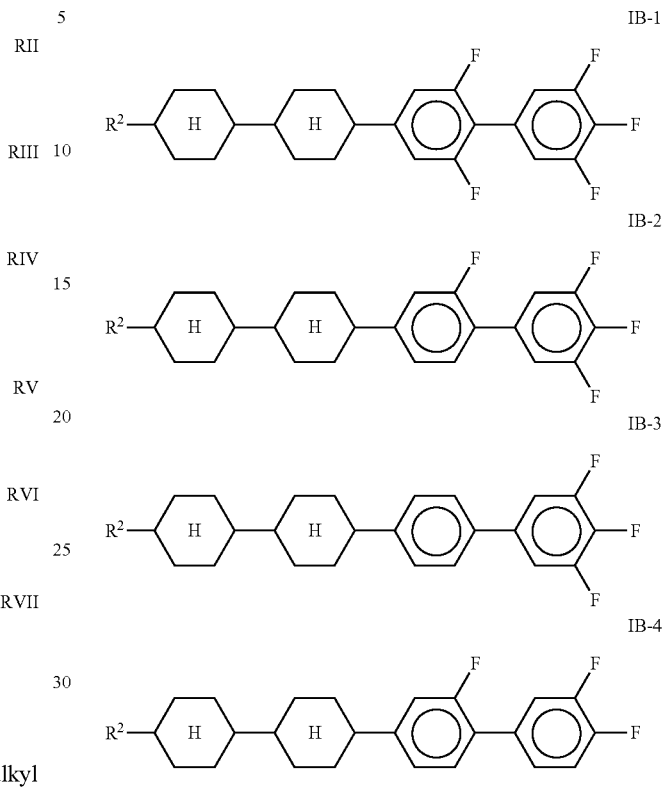

in which
$R^2$ is H, a halogenated, CN-substituted or unsubstituted alkyl radical having 1 to 15 C atoms, in which one or more $CH_2$ groups are optionally replaced, independently of one another, by —C≡C—, —CO—, —CH═CH—, —O—,

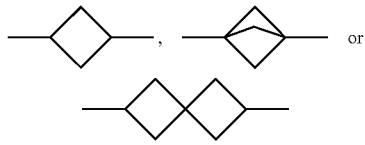

in such a way that O atoms are not linked directly to one another.

18. A liquid-crystalline medium according to claim 1, comprising one or more compounds of formulae RII to RIII.

19. A liquid-crystalline medium according to claim 1, comprising one or more compounds of formulae RIV to RV.

20. A liquid-crystalline medium according to claim 1, comprising one or more compounds of formulae RVI to RVII.

* * * * *

UNITED STATES PATENT AND TRADEMARK OFFICE
CERTIFICATE OF CORRECTION

PATENT NO.       : 8,715,527 B2
APPLICATION NO.  : 12/812657
DATED            : May 6, 2014
INVENTOR(S)      : Georg Luessem et al.

Page 1 of 1

It is certified that error appears in the above-identified patent and that said Letters Patent is hereby corrected as shown below:

IN THE CLAIMS:

Column 57, line 15 (Claim 3), Formula IA-4 presents as follows:

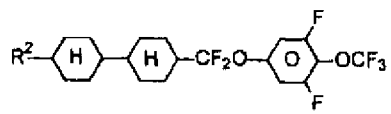

Should present as:

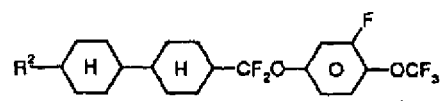

Signed and Sealed this
Thirtieth Day of September, 2014

Michelle K. Lee
*Deputy Director of the United States Patent and Trademark Office*

UNITED STATES PATENT AND TRADEMARK OFFICE
CERTIFICATE OF CORRECTION

PATENT NO. : 8,715,527 B2
APPLICATION NO. : 12/812657
DATED : May 6, 2014
INVENTOR(S) : Luessem et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 266 days.

Signed and Sealed this
Twenty-ninth Day of September, 2015

Michelle K. Lee
*Director of the United States Patent and Trademark Office*